(12) United States Patent
Anezaki et al.

(10) Patent No.: US 10,237,427 B2
(45) Date of Patent: Mar. 19, 2019

(54) IMAGE FORMING SYSTEM, REMOTE TERMINAL, IMAGE FORMING APPARATUS, AND RECORDING MEDIUM

(71) Applicants: Kazuya Anezaki, Amagasaki (JP); Hiroaki Sugimoto, Nagoya (JP); Shuji Yoneda, Osaka (JP); Hidetaka Iwai, Itami (JP); Takeshi Maekawa, Amagasaki (JP); Junichi Hase, Osaka (JP)

(72) Inventors: Kazuya Anezaki, Amagasaki (JP); Hiroaki Sugimoto, Nagoya (JP); Shuji Yoneda, Osaka (JP); Hidetaka Iwai, Itami (JP); Takeshi Maekawa, Amagasaki (JP); Junichi Hase, Osaka (JP)

(73) Assignee: KONICA MINOLTA BUSINESS TECHNOLOGIES, INC., Tokyo (JP)

( * ) Notice: Subject to any disclaimer, the term of this patent is extended or adjusted under 35 U.S.C. 154(b) by 0 days.

(21) Appl. No.: 13/752,839

(22) Filed: Jan. 29, 2013

(65) Prior Publication Data

US 2013/0194631 A1    Aug. 1, 2013

(30) Foreign Application Priority Data

Jan. 30, 2012    (JP) .................... 2012-016344

(51) Int. Cl.
*G06F 3/041*    (2006.01)
*H04N 1/00*    (2006.01)

(52) U.S. Cl.
CPC ....... *H04N 1/0035* (2013.01); *H04N 1/00204* (2013.01); *H04N 1/00384* (2013.01);
(Continued)

(58) Field of Classification Search
CPC ............. H04N 1/0035; H04N 1/00204; H04N 1/00384; H04N 1/00408; H04N 5/44513;
(Continued)

(56) References Cited

U.S. PATENT DOCUMENTS 5,140,346 A * 8/1992 Goto ..................... B41J 3/46
346/145
2003/0211865 A1* 11/2003 Azami et al. .............. 455/557
(Continued)

FOREIGN PATENT DOCUMENTS

CN    1968334 A    5/2007
CN    1968335 A    5/2007
(Continued)

OTHER PUBLICATIONS

Machine translation of JP2011-124914 to Ide Takashi.*
(Continued)

*Primary Examiner* — Benny Q Tieu
*Assistant Examiner* — Haris Sabah
(74) *Attorney, Agent, or Firm* — Buchanan Ingersoll & Rooney PC

(57) ABSTRACT

An image forming system comprises an image forming apparatus and a remote operation apparatus. The image forming apparatus comprises a detection part for detecting a state change of a hardware operating member in an operation part of the image forming apparatus and a transmitting part for transmitting screen control information in accordance with the state change detected by the detection part to the remote operation apparatus. The remote operation apparatus comprises a display part for displaying a simulated image representing the detection part of the image forming apparatus, a receiving part for receiving the screen control information, and a display control part for changing a first image which is the simulated image displayed on the display
(Continued)

part before the state change into a second image which is the simulated image in which the state change is reflected, in response to a receipt of the screen control information.

72 Claims, 21 Drawing Sheets

(52) U.S. Cl.
CPC ... *H04N 1/00408* (2013.01); *H04N 2201/001* (2013.01); *H04N 2201/0039* (2013.01); *H04N 2201/0075* (2013.01); *H04N 2201/0094* (2013.01)

(58) Field of Classification Search
CPC ..... H04N 2201/001; H04N 2201/0039; H04N 2201/0075; H04N 2201/0094
See application file for complete search history.

(56) References Cited

U.S. PATENT DOCUMENTS

| | | | |
|---|---|---|---|
| 2005/0151995 A1* | 7/2005 | Hauser | G06Q 20/1085 358/1.15 |
| 2006/0171734 A1* | 8/2006 | Maeda | G03G 15/5016 399/81 |
| 2007/0097428 A1* | 5/2007 | Yamada et al. | 358/1.15 |
| 2007/0109561 A1 | 5/2007 | Suzue | |
| 2007/0109578 A1 | 5/2007 | Suzue | |
| 2008/0158596 A1* | 7/2008 | Kadota | 358/1.15 |
| 2009/0009803 A1* | 1/2009 | Takeuchi et al. | 358/1.15 |
| 2010/0030914 A1 | 2/2010 | Sparks et al. | |
| 2010/0070629 A1* | 3/2010 | Wang | 709/224 |
| 2010/0188348 A1* | 7/2010 | Aono | G06F 3/0219 345/173 |
| 2010/0313125 A1* | 12/2010 | Fleizach et al. | 715/702 |
| 2010/0313163 A1* | 12/2010 | Yamada et al. | 715/781 |
| 2011/0191440 A1* | 8/2011 | Morikawa | 709/217 |
| 2012/0062946 A1* | 3/2012 | Kitagata | 358/1.15 |
| 2012/0192077 A1* | 7/2012 | Castellani | G03G 15/5079 715/740 |
| 2012/0293823 A1* | 11/2012 | Gribel | G06F 3/1205 358/1.13 |

FOREIGN PATENT DOCUMENTS

| | | |
|---|---|---|
| JP | 2004-364083 | 12/2004 |
| JP | 2007-140758 A | 6/2007 |
| JP | 2011-124914 A | 6/2011 |
| JP | 2011-133630 A | 7/2011 |

OTHER PUBLICATIONS

Machine translation in english of JP Pub 2011-124914 to Ide Takashi.*

Machine translation (from Japanese to English) of JP Pub 2011-124914 to Ide Takashi.*

Office Action (notification of Reasons for Rejection) dated Feb. 18, 2014, by the Japanese Patent Office in corresponding Japanese Patent Application No. 2012-016344, and an English Translation of the Office Action. (5 pages).

Office Action issued by State Intellectual Property Office of the People's Republic of China (SIPO) dated Dec. 31, 2014 in corresponding Chinese Application No. 201310028542.5, and English language translation of Office Action (20 pages).

Japanese Office Action dated Nov. 11, 2014, by the Japan Patent Office, in corresponding Japanese Patent Application No. 2012-016344 with English translation (4 pages).

* cited by examiner

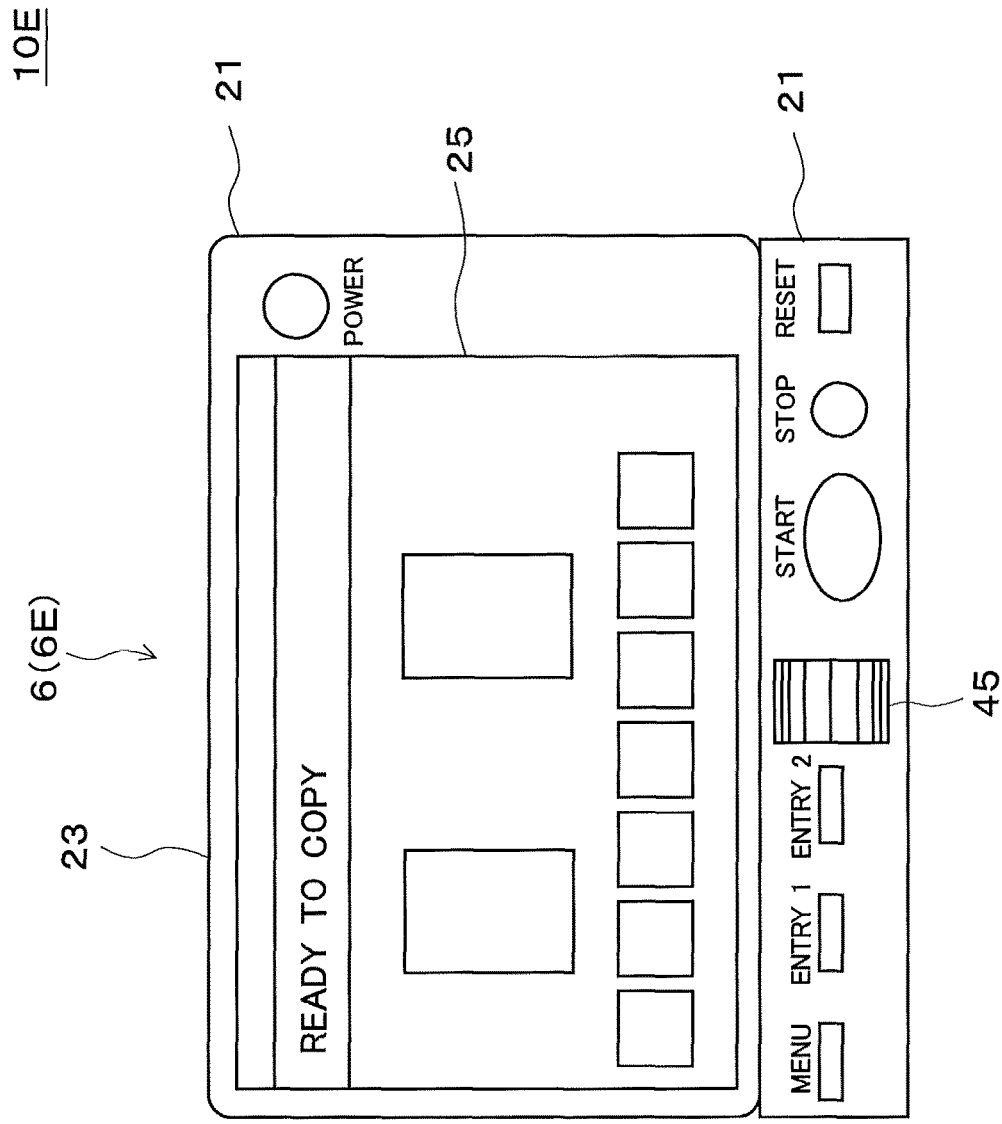

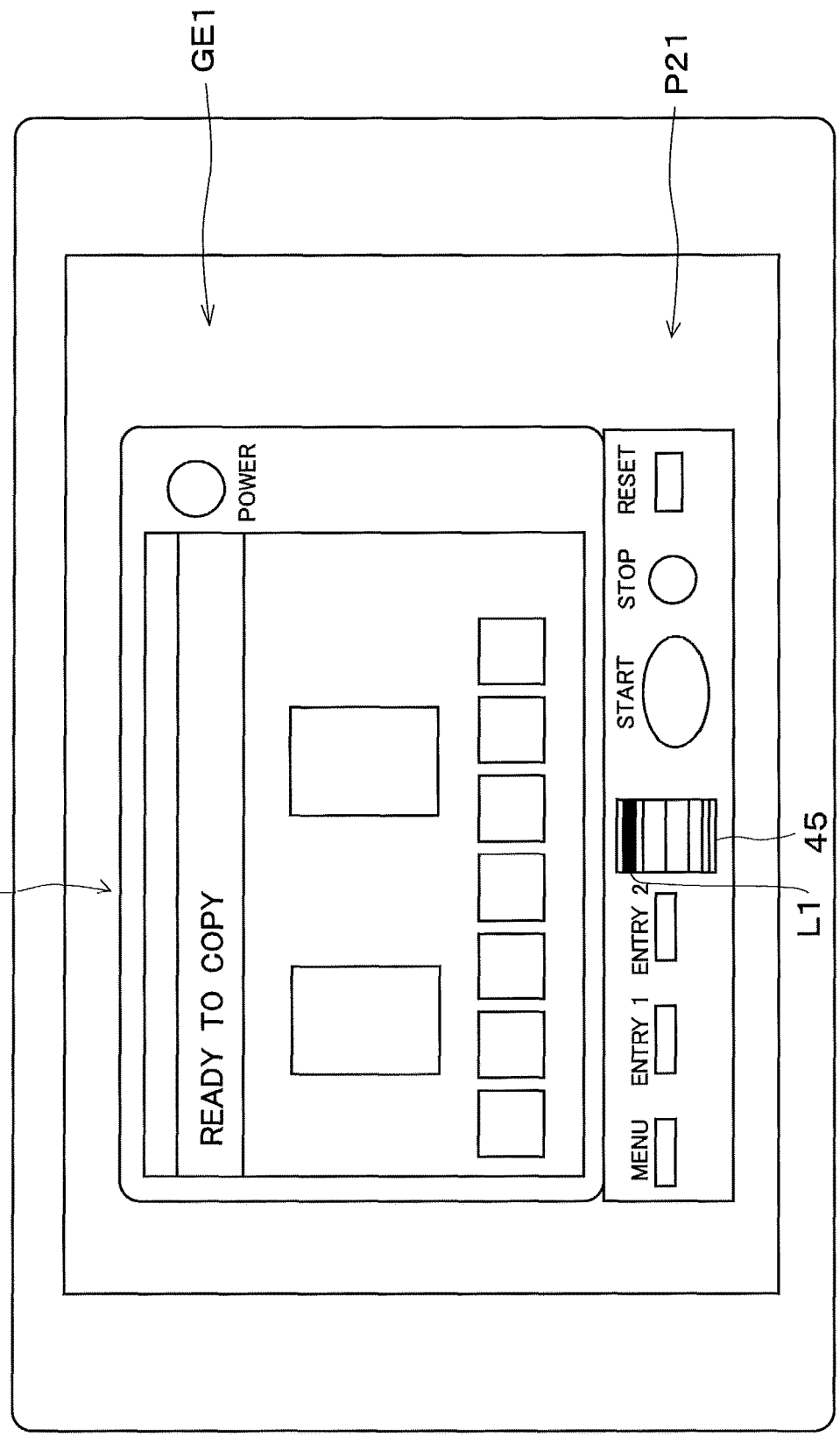

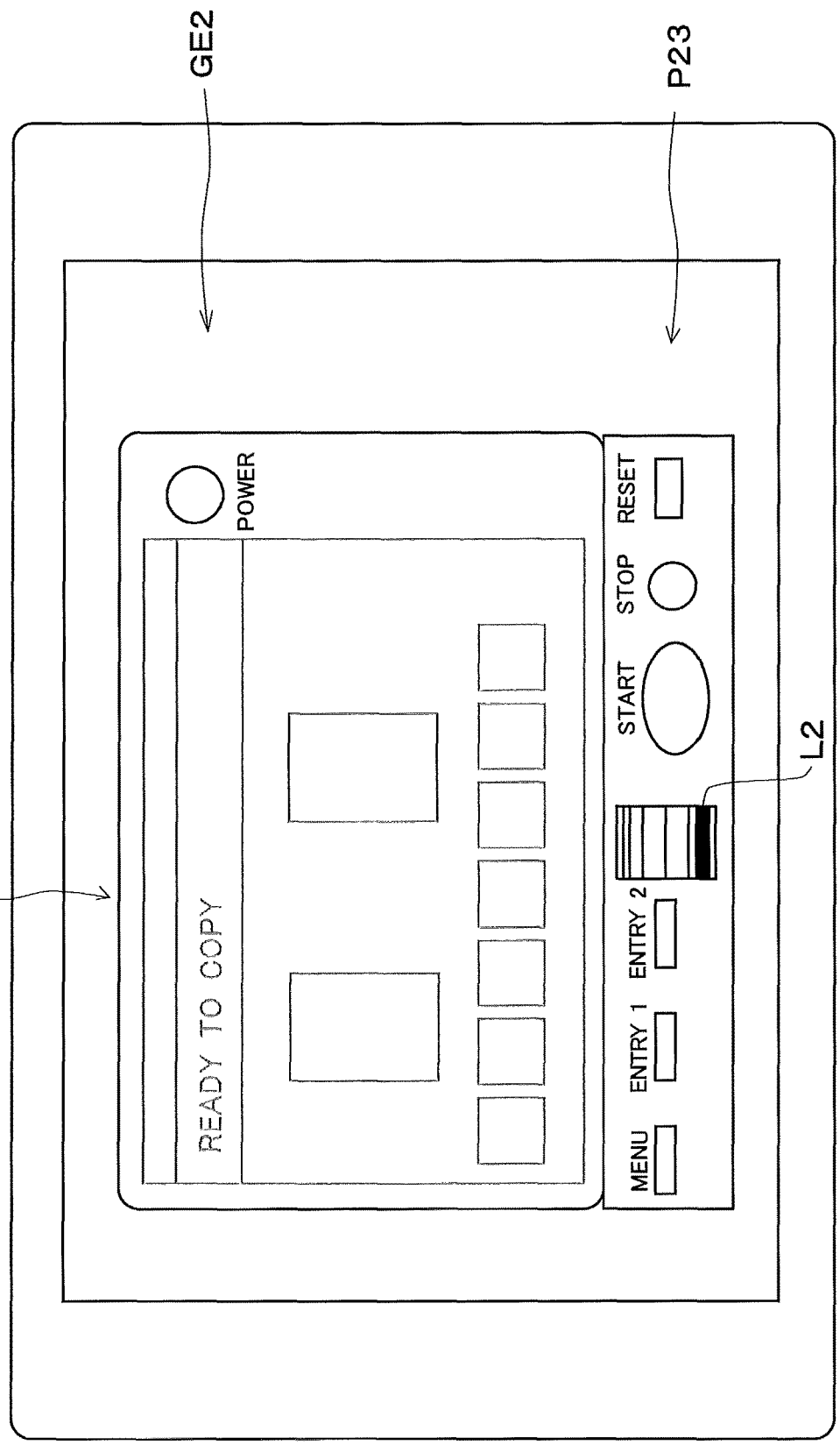

IMAGE FORMING SYSTEM, REMOTE TERMINAL, IMAGE FORMING APPARATUS, AND RECORDING MEDIUM

This application is based on Japanese Patent Application No. 2012-016344 filed on Jan. 30, 2012, the contents of which are hereby incorporated by reference.

BACKGROUND OF THE INVENTION

Field of the Invention

The present invention relates to an image forming system capable of remotely operating an image forming apparatus and a technique relevant to the same.

Description of the Background Art

An image forming system capable of remotely operating an image forming apparatus such as an MFP (Multi-Functional Peripheral) has been proposed (see, for example, Japanese Patent Application Laid Open Gazette No. 2004-364083 (Patent Document 1)).

In a technique disclosed in Patent Document 1, information on a tray status (specifically, paper size placed in a paper tray) of an image forming apparatus (copier) is transmitted to a remote operation apparatus (remote control apparatus). Then, the remote operation apparatus has the received information reflected in the content of an operation command on the side of the remote operation apparatus.

Now, there are call centers which receive inquiries on how to use the image forming apparatuses, or the like, from operating users of the image forming apparatuses. Even in a situation where operators of such call centers make explanations on how to operate the image forming apparatuses in response to the inquiries from the operating users of the image forming apparatuses, an image forming system (also referred to as a remote operation system) involving such a remote operation as discussed above can be used.

In such a situation, it is preferable that the operator of the call center should be correctly notified of the condition of the image forming apparatus used by a user (operating user of the image forming apparatus) who inquires at the call center.

In the technique of Patent Document 1, however, contents in an operation screen of the remote operation apparatus are fixed, and an operation result of a hardware operating member, for example, is not reflected in a display screen of an operator terminal. Therefore, there arises a situation where the operator of the call center gives an explanation on how to operate the apparatus while watching the display screen displaying a content different from that displayed on a browsing screen used by the operating user of the MFP. For this reason, the system is not always easy to use. In other words, the operability of the system is not always sufficient for practical use.

SUMMARY OF THE INVENTION

It is an object of the present invention to provide a technique for improving the operability of an image forming system involving a remote operation.

The present invention is intended for an image forming system. According to a first aspect of the present invention, the image forming system includes an image forming apparatus, and a remote operation apparatus capable of remotely operating the image forming apparatus, and in the image forming system of the present invention, the image forming apparatus includes a detection part for detecting a state change of a hardware operating member in an operation part of the image forming apparatus and a transmitting part for transmitting screen control information in accordance with the state change detected by the detection part to the remote operation apparatus, and the remote operation apparatus comprises a display part for displaying a simulated image representing the operation part of the image forming apparatus, a receiving part for receiving the screen control information, and a display control part for changing a first image which is the simulated image displayed on the display part before the state change into a second image which is the simulated image in which the state change is reflected, in response to a receipt of the screen control information.

The present invention is also intended for an image forming apparatus which can be remotely operated by a remote operation apparatus. According to a second aspect of the present invention, the image forming apparatus includes an operation part having a hardware operating member, a detection part for detecting a state change of the hardware operating member, and a transmitting part for transmitting screen control information in accordance with the state change detected by the detection part to the remote operation apparatus, to thereby change a display image displayed on a display screen of the remote operation apparatus from a first image which is a simulated image of the operation part before the state change into a second image which is a simulated image in which the state change is reflected.

The present invention is still also intended for a remote operation apparatus capable of remotely operating an image forming apparatus. According to a third aspect of the present invention, the remote operation apparatus includes a display part for displaying a simulated image representing an operation part of the image forming apparatus, a receiving part for receiving screen control information from the image forming apparatus, the screen control information being generated in response to detection of a state change of a hardware operating member in the operation part of the image forming apparatus, and a display control part for changing a first image which is the simulated image displayed on the display part before the state change into a second image which is the simulated image in which the state change is reflected, in response to a receipt of the screen control information.

The present invention is further intended for a non-transitory computer-readable recording medium. According to a fourth aspect of the present invention, the non-transitory computer-readable recording medium records therein a computer program to be executed by a computer to cause the computer to perform the steps of a) displaying a first image which is a simulated image representing an operation part of an image forming apparatus on a display part, b) receiving screen control information from the image forming apparatus, the screen control information being generated in response to detection of a state change of a hardware operating member in the operation part of the image forming apparatus, and c) changing a display image displayed on the display part from the first image into a second image which is the simulated image in which the state change is reflected, in response to a receipt of the screen control information.

These and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a plan view showing an operation part of an image forming apparatus in accordance with a fifth preferred embodiment of the present invention;

FIG. 20 is a view showing an exemplary display (corresponding to a high luminance state) in the remote operation apparatus; and FIG. 21 is a view showing another exemplary display (corresponding to a low luminance state) in the remote operation apparatus.

DESCRIPTION OF THE PREFERRED EMBODIMENTS

Hereinafter, with reference to figures, discussion will be made on the preferred embodiments of the present invention.

<1. The First Preferred Embodiment>
<1-1. Overall Configuration>

Figure 1:
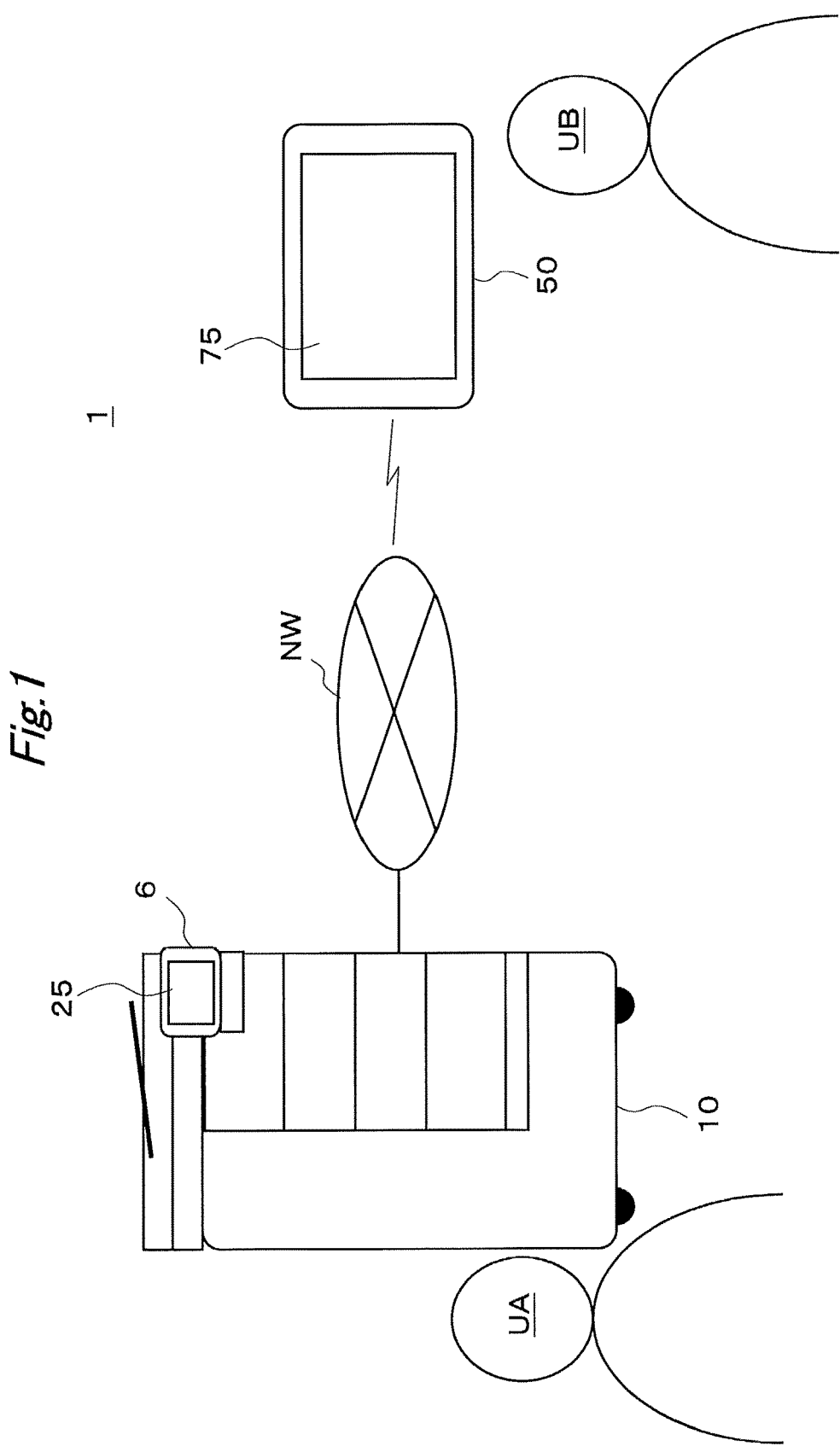
FIG. 1 is a view showing an image forming system in accordance with a first preferred embodiment of the present invention.

FIG. 1 is a view showing an image forming system 1 (also referred to as an image forming system 1A) in accordance with the first preferred embodiment of the present invention. As shown in FIG. 1, the image forming system 1A comprises an image forming apparatus 10 (also referred to as an image forming apparatus 10A) and a remote operation apparatus (remote control apparatus) 50 (also referred to as a remote operation apparatus 50A).

The image forming apparatus 10 and the remote operation apparatus 50 are connected to each other via a network NW. The network NW includes a LAN (Local Area Network), the internet, and the like. The connection to the network NW may be wired or wireless. There is a case, for example, where the image forming apparatus 10 is connected to the network NW via wired communication and the remote operation apparatus 50 is connected to the network NW via wireless communication.

In the image forming system 1, various operations of the image forming apparatus 10 can be performed by using the remote operation apparatus 50. In other words, the remote operation apparatus 50 is capable of remotely operating the image forming apparatus 10.

<1-2. Constitution of Image Forming Apparatus 10>

Figure 2:
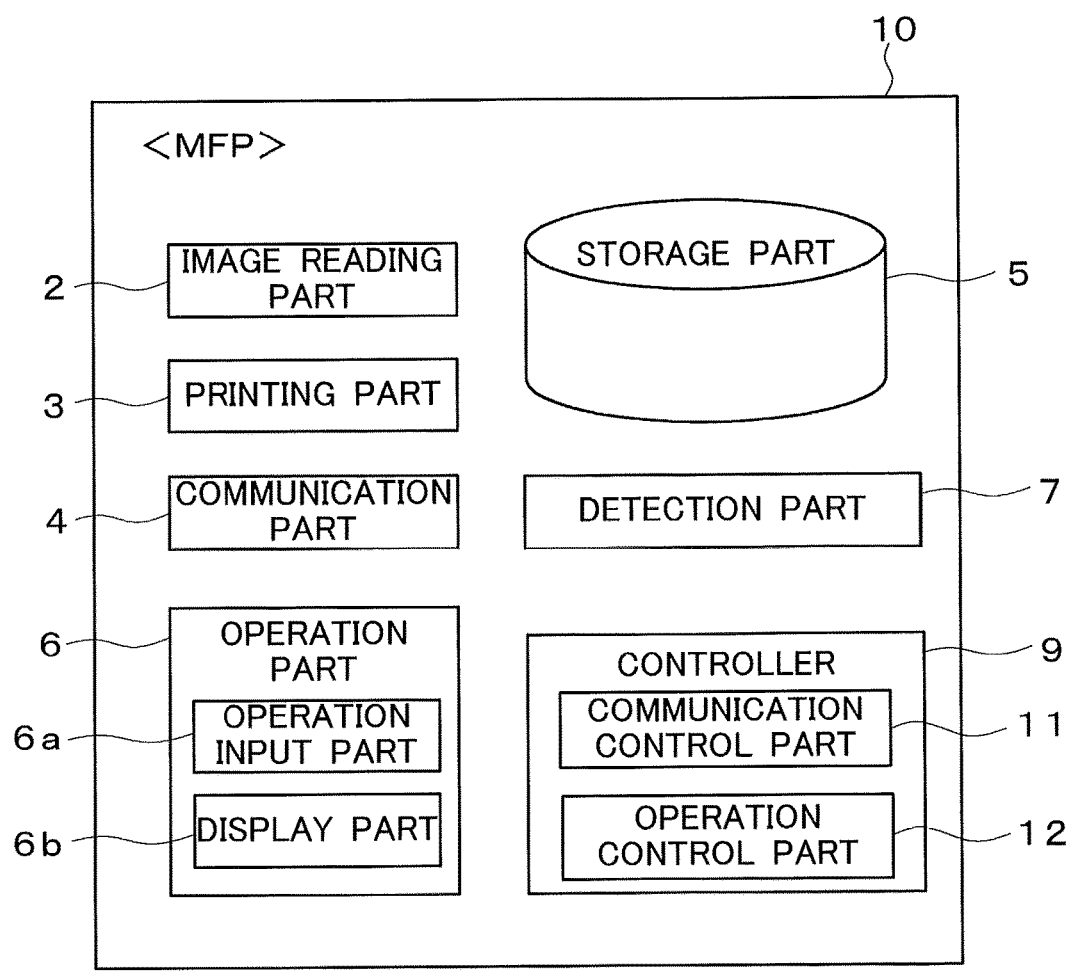
FIG. 2 is a view showing function blocks of an image forming apparatus.

FIG. 2 is a view showing function blocks of the image forming apparatus 10. Herein, as an example of the image forming apparatus 10, shown is an MFP (Multi-Functional Peripheral). FIG. 2 shows function blocks of an MFP 10.

The MFP 10 is an apparatus (also referred to as a multifunction machine) having a scanner function, a copy function, a facsimile communication function, a box storage function, and the like. Specifically, as shown in the functional block diagram of FIG. 2, the MFP 10 comprises an image reading part 2, a printing part 3, a communication part 4, a storage part 5, an operation part 6, a detection part 7, a controller 9, and the like and multiply uses these constituent parts to implement various functions.

The image reading part 2 is a processing part which optically reads (in other words, scans) an original manuscript placed on a predetermined position of the MFP 10 and generates image data of the original manuscript (also referred to as an "original manuscript image" or a "scan image"). The image reading part 2 is also referred to as a scanning part.

The printing part 3 is an output part which prints out an image to various media such as paper on the basis of the data on an object to be printed.

The communication part 4 is a processing part capable of performing facsimile communication via public networks or the like. Further, the communication part 4 is capable of performing network communication via the network NW. The network communication uses various protocols such as TCP/IP (Transmission Control Protocol/Internet Protocol) and the like. By using the network communication, the MFP 10 can transmit and receive various data to/from desired partners (for example, the remote operation apparatus 50).

The storage part 5 is a storage unit such as a hard disk drive (HDD) or/and the like. The storage part 5 stores therein data relevant to printing jobs and the like.

The operation part 6 comprises an operation input part 6a for receiving an input which is given to the MFP 10 and a display part 6b for displaying various information thereon. The MFP 10 is provided with a touch screen 25 (see FIG. 1) which is a liquid crystal display panel in which a piezoelectric sensor or the like is embedded. The touch screen 25 serves as part of the operation input part 6a and also serving as part of the display part 6b.

The detection part 7 has various detection sensors and the like and detects a state (physical state) of a hardware operating member such as a ten key 27 (see FIG. 5) or the like in the operation part 6 (6A) of the image forming apparatus 10. The detection part 7 has, for example, a state detection sensor 28 formed of a mechanical switch or the like and detects a state of the ten key 27 provided on an operation panel 23 of the operation part 6 (in more detail, a state in accordance with a slide position of the operation panel 23).

The controller 9 is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined software program (hereinafter, also referred to simply as a "program") PG1 stored in the ROM (e.g., EEPROM), to thereby implement various processing parts. Further, the program (in more detail, program module group) PG1 may be acquired via various portable (in other words, non-transitory) computer-readable recording media such as a USB memory or the like or via the network NW or the like and installed into the MFP 10.

Specifically, as shown in FIG. 2, the controller 9 executes the program PG1, to thereby implement various processing parts including a communication control part 11 and an operation control part 12.

The communication control part 11 is a processing part for controlling a communication with other apparatus(es) (the remote operation apparatus 50 or/and the like). The communication control part 11 sends screen control information NM in accordance with a state change detected by the detection part 7 to the remote operation apparatus 50. The screen control information NM includes, for example, data indicating that a state change occurs (data indicating a state after the state change, or the like).

The operation control part 12 controls various operations such as a printing operation, a scan operation, and the like of the image forming apparatus 10.

<1-3. Constitution of Remote Operation Apparatus 50>

Next, discussion will be made on a constitution of the remote operation apparatus 50.

The remote operation apparatus 50 is a portable information input/output terminal device, which is capable of performing network communication with other apparatuses. Herein, as an example of the remote operation apparatus 50, shown is a tablet terminal. The remote operation apparatus 50, however, is not limited to this but may be a smartphone, a personal computer, or the like. Further, the remote operation apparatus 50 may be a portable device or a stationary device.

Figure 3:
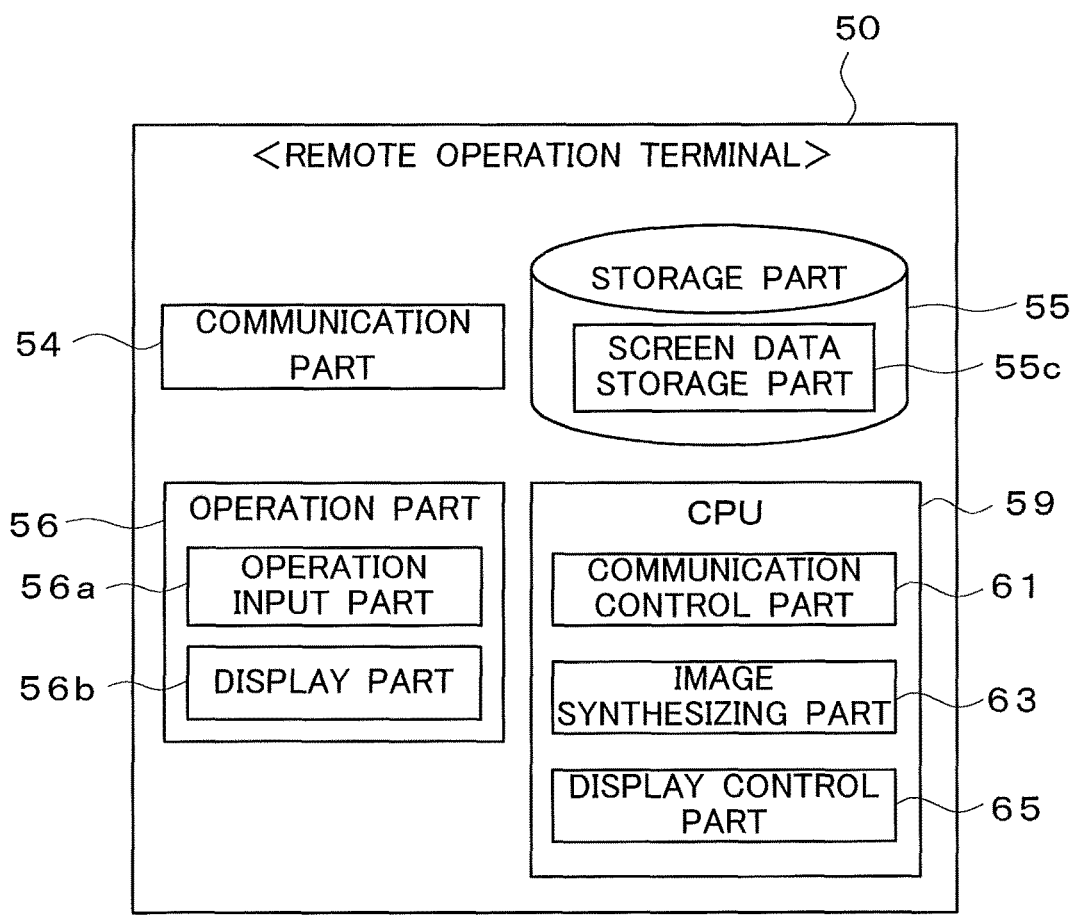
FIG. 3 is a functional block diagram showing a schematic constitution of a remote operation apparatus.

FIG. 3 is a functional block diagram showing a schematic constitution of the remote operation apparatus 50.

As shown in the functional block diagram of FIG. 3, the remote operation apparatus 50 comprises a communication part 54, a storage part 55, an operation part 56, a controller 59, and the like and multiply uses these constituent parts to implement various functions.

The communication part 54 is capable of performing network communication via the network NW. The network communication uses various protocols such as TCP/IP (Transmission Control Protocol/Internet Protocol) and the like. By using the network communication, the remote operation apparatus 50 can transmit and receive various data to/from desired partners (the image forming apparatus 10 or/and the like). The communication part 54 receives the screen control information NM or the like in accordance with a state of the operation panel of the image forming apparatus 10 from the image forming apparatus 10.

The storage part 55 is a storage unit such as a nonvolatile semiconductor memory or the like. The storage part 55 has a screen data storage part 55c. The screen data storage part 55c stores therein various element images (element image group) to be used for generating an operation screen for remote operation in advance (prior to the receipt of the screen control information NM).

The operation part 56 comprises an operation input part 56a for receiving an input which is given to the remote operation apparatus 50 and a display part 56b for displaying various information thereon. The remote operation apparatus 50 is provided with a touch screen 75 (see FIG. 1) which is a liquid crystal display panel in which a piezoelectric sensor or the like is embedded. The touch screen 75 serves as part of the operation input part 56a and also serving as part of the display part 56b.

As discussed later, on the display part 56b (touch screen 75), displayed is a simulated image (see FIGS. 6 and 7) representing the operation part 6 of the image forming apparatus 10.

The controller 59 is a control unit for generally controlling the remote operation apparatus 50. The controller 59 is a computer system which is embedded in the remote operation apparatus 50 and comprises a CPU, various semiconductor memories (RAM and ROM), and the like. The controller 59 causes the CPU to execute a predetermined software program (hereinafter, also referred to simply as a "program") PG2 stored in a memory part (semiconductor memory or the like), to thereby implement various processing parts. Further, the program PG2 may be acquired via various portable (in other words, non-transitory) computer-readable recording media such as a USB memory or the like or via the network NW or the like and installed into the remote operation apparatus 50.

The program PG2 is application software for remotely operating the image forming apparatus 10 and used for implementing various functions relevant to the remote operation.

Specifically, as shown in FIG. 3, the controller 59 executes the program PG2, to thereby implement various processing parts including a communication control part 61, an image synthesizing part 63, and a display control part 65.

The communication control part 61 is a processing part for controlling a communication with the image forming apparatus 10 and the like in cooperation with the communication part 54 and the like.

The image synthesizing part 63 is a processing part (also referred to as an image generation part) for generating an operation image GA to be used for remotely operating the image forming apparatus 10. The image synthesizing part 63 synthesizes a plurality of element images (image constituent elements) stored in the screen data storage part 55c in advance, to thereby generate the operation image GA. The operation image GA is generated as an image in which a current state of the operation part 6 of the image forming apparatus 10 is reflected. The operation image GA is an image simulating the state of the operation part 6 of the image forming apparatus 10 and therefore referred to also as a simulated image.

The display control part 65 is a processing part for controlling a display operation in the display part 56b (the touch screen 75 or the like). The display control part 65 displays the operation image GA and the like to be used for remotely operating the image forming apparatus 10 on the touch screen 75, in cooperation with the image synthesizing part 63. In more detail, the display control part 65 changes an operation image (simulated image) GA1 displayed on the touch screen 75 before the state change into an operation image (simulated image) GA2 in which a current state change of the operation part 6 (the hardware operating member) is reflected, in response to the receipt of the screen control information NM.

<1-4. Constitution of Operation Part in MFP>

Figure 4:
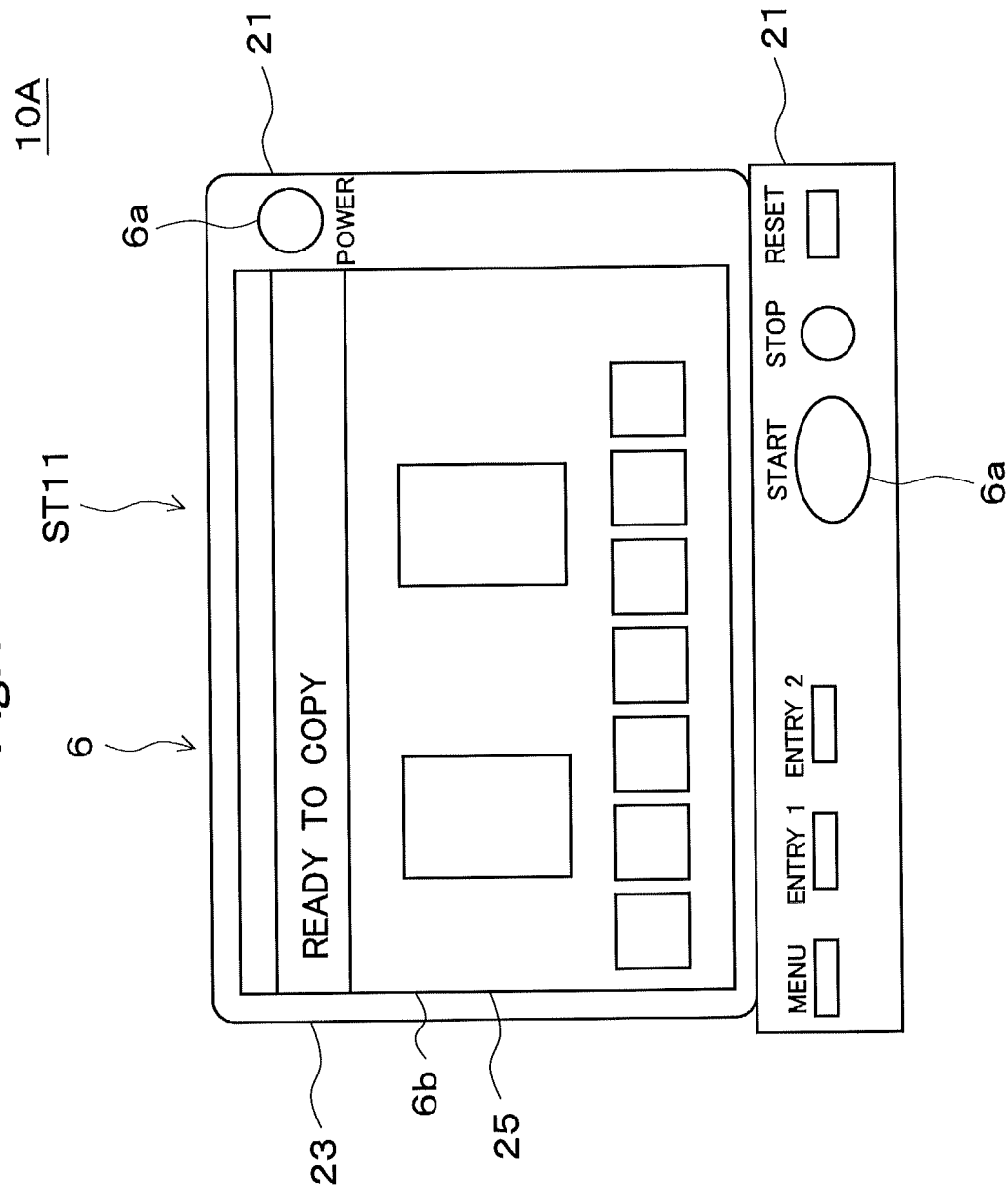
FIGS. 4 and 5 are plan views each showing a detailed configuration of an operation part of the image forming apparatus.
Figure 5:
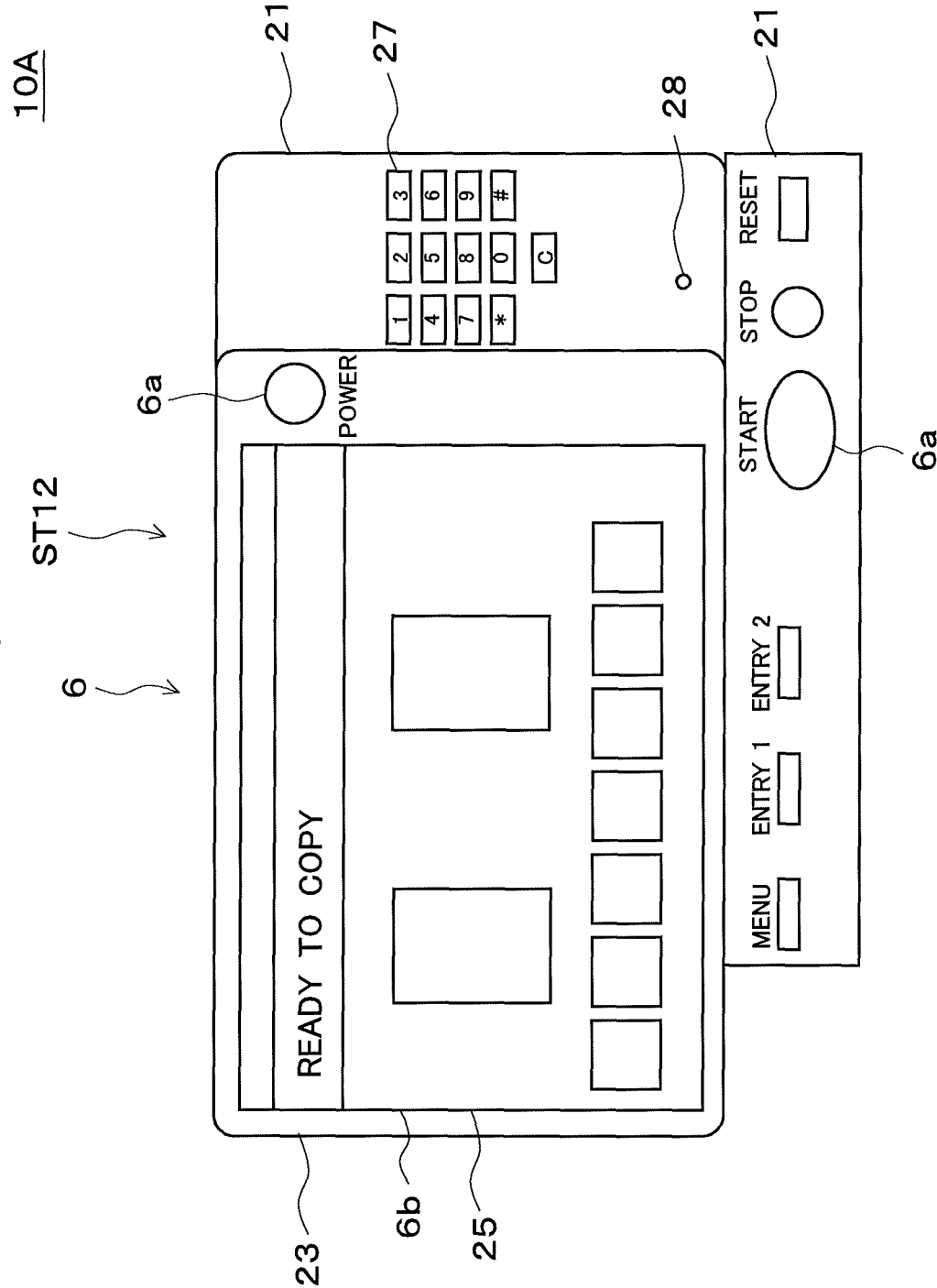

FIGS. 4 and 5 are plan views each showing a detailed configuration of the operation part 6 of the image forming apparatus 10 (see FIG. 1).

As shown in these figures, the operation part 6 has a substantially plate-like main body 21 and a sliding operation panel 23.

The operation panel 23 is provided on a frontward side of the main body 21. Between the main body 21 and the operation panel 23, provided is a sliding mechanism, and the operation panel 23 can be slidingly moved in a left-and-right (horizontal) direction with respect to the main body 21. Thus, the sliding operation panel 23 provided on the frontward side can be slidingly moved in the left-and-right (horizontal) direction with respect to the main body 21 on a rear surface side. FIG. 5 shows a state where the operation panel 23 is moved leftward as compared with the state of FIG. 4. Conversely, when the operation panel 23 is moved rightward from the state of FIG. 5, the operation panel 23 can be returned to the state of FIG. 4.

As shown in FIG. 5, on a right side in the front surface of the main body 21, provided is a ten key (hardware key) 27. The ten key 27 is a hardware key provided on a rear surface side of the operation panel 23. In more detail, the ten key 27 is hidden behind the rear surface of the operation panel 23 in a state ST11 of FIG. 4 while the ten key 27 is exposed, not being hidden behind the operation panel 23, in a state ST12 of FIG. 5. Thus, the state of the ten key 27 is switched between the above two states (the state ST11 of FIG. 4 (also referred to as a "not-exposed state") and the state ST12 of FIG. 5 (also referred to as an "exposed state") in response to the slide operation of the operation panel 23.

Further, the main body 21 is provided with a state detection sensor 28 for detecting the state of the ten key 27. The state detection sensor 28 is a constituent element of the detection part 7 and is a sensor for detecting a state change of the ten key 27 (between the above two states ST11 and ST12).

The state detection sensor 28 is, for example, a mechanical switch. The mechanical switch has a moving member which moves in a fore-and-aft direction (frontward and backward) with respect to the main body 21. The moving member is provided so that a front end side thereof may protrude from a surface of the main body 21 and urged frontward by an urging part such as a spring. In the not-exposed state ST11 of the ten key 27, the front end side of the moving member of the mechanical switch is pressed by the rear surface of the operation panel 23. On the other hand, when the operation panel 23 is slidingly moved leftward, to thereby change the state of the ten key 27 into the exposed state ST12, the contact between the front end of the mechanical switch and the rear surface of the operation panel 23 is released and the moving member of the mechanical switch is moved frontward by the urging force. The mechanical switch outputs two different electrical signals (HI signal and LO signal) in the two states, respectively, and the electrical signal in accordance with the state is transferred to the controller 9 of the image forming apparatus 10. The image forming apparatus 10 can thereby recognize the state of the ten key 27.

The operation panel 23 has the touch screen 25 on a front side thereof. In the touch screen 25, displayed is a menu image (including button images and the like). By pressing buttons which are virtually arranged in the touch screen 25 (which are represented by the button images), an operator can set various operations of the image forming apparatus 10 or the like.

<1-5. Constitution of Operation Part in Remote Operation Apparatus>

Figure 6:
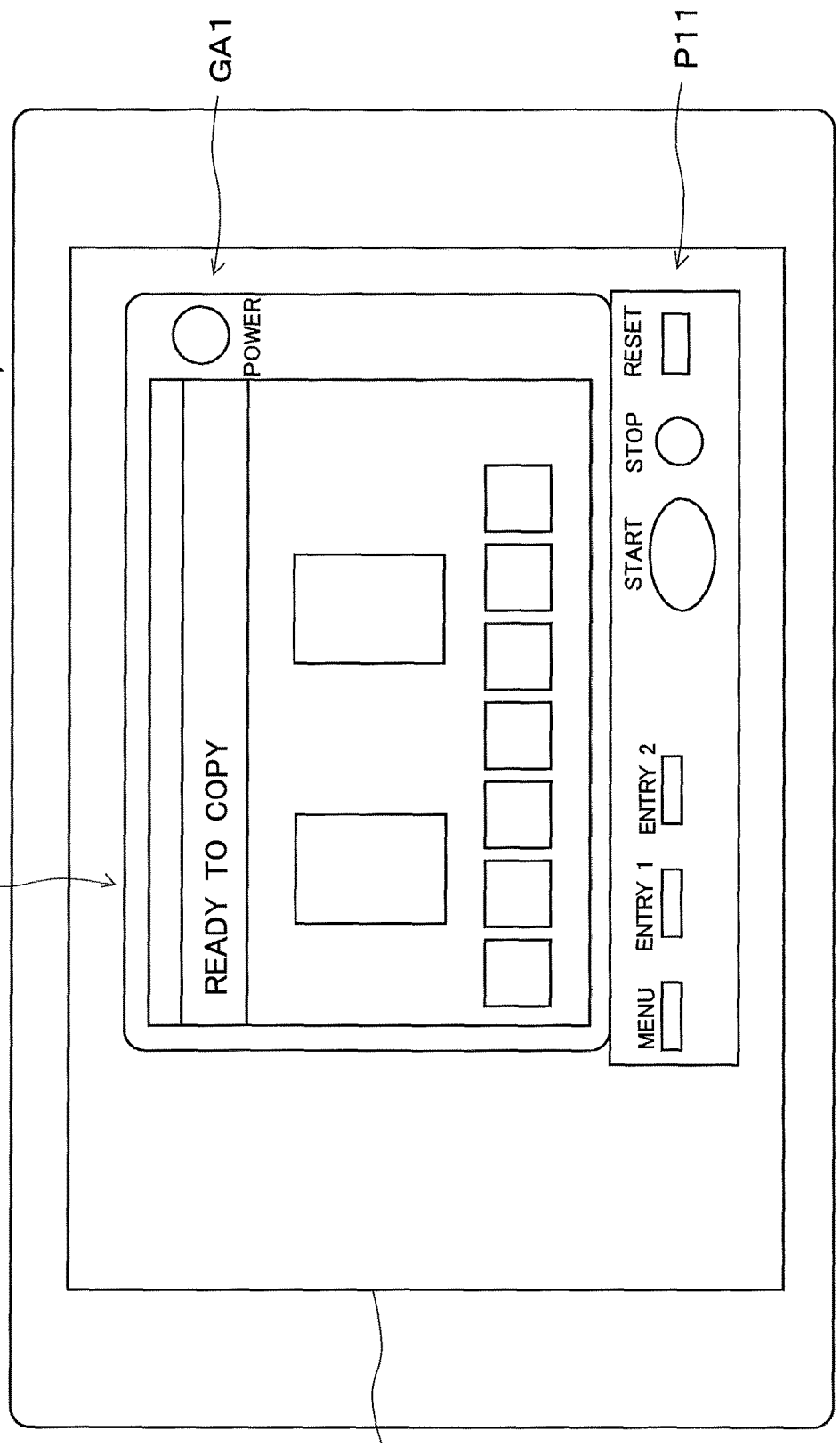
FIG. 6 is a view showing a simulated image in which a ten key is not exposed.

FIG. 6 is a view showing a detailed configuration of the remote operation apparatus 50 (50A) (in more detail, the operation part 56). As shown in FIG. 6, the remote operation apparatus 50 comprises the operation part 56 on a front surface thereof. Specifically, the touch screen 75 is provided almost entirely on a front surface side of the substantially plate-like remote operation apparatus' 50, except a peripheral portion (frame portion) thereof.

On the touch screen 75, displayed is the simulated image GA representing the operation part 6 of the image forming apparatus 10. The simulated image GA includes images simulating constituent elements such as keys (a start key and the like) on a lower side in the front surface of the main body 21, hardware keys in the operation panel 23 (a power button and the like), a display image in the touch screen 25, the ten key 27, and the like. As discussed later, the simulated image GA1 is displayed on the touch screen 75 (see FIG. 6) in the not-exposed state ST11 of the ten key 27 (see FIG. 4) while the simulated image GA2 is displayed on the touch screen 75 (see FIG. 7) in the exposed state ST12 of the ten key 27 (see FIG. 5).

Figure 7:
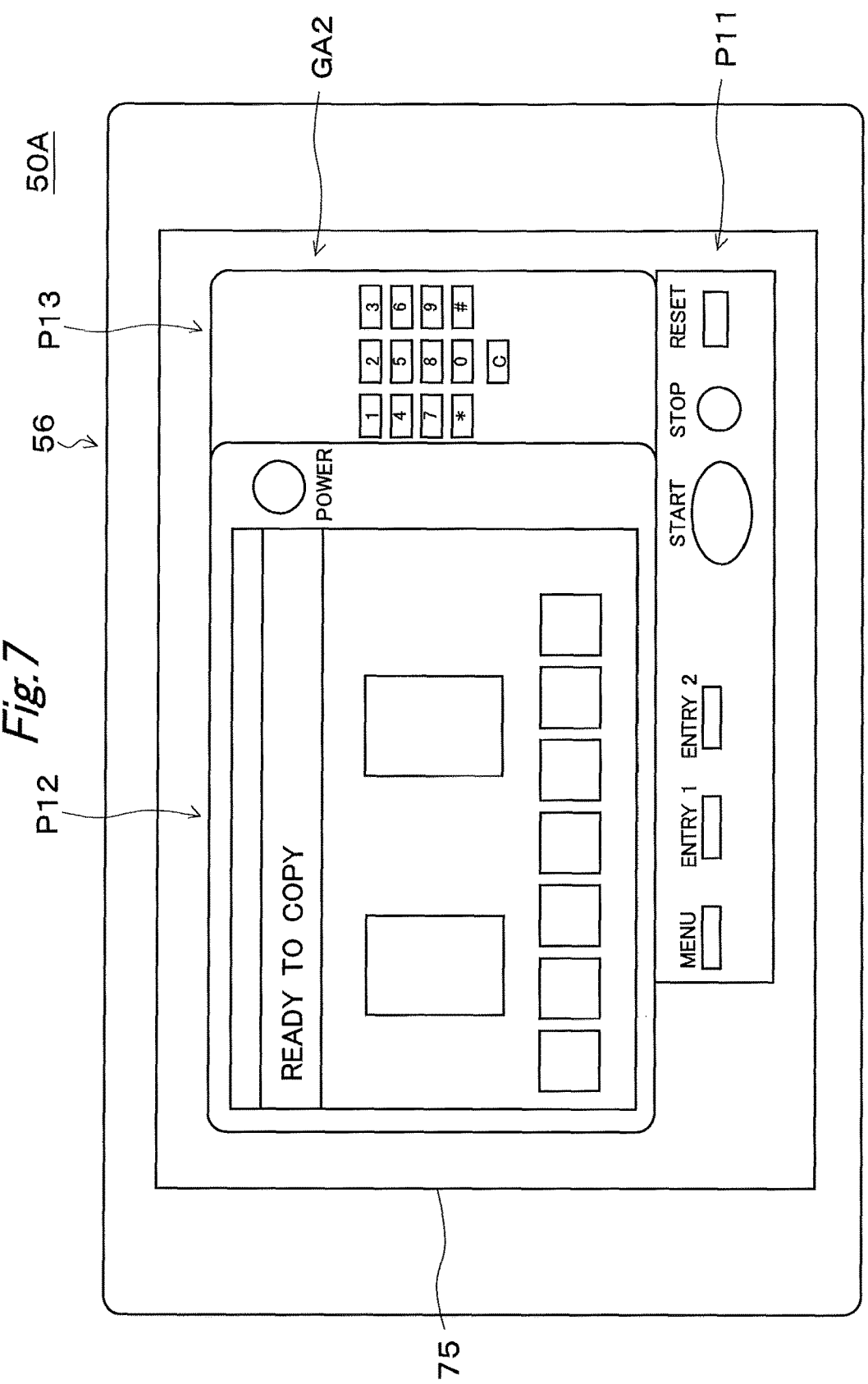
FIG. 7 is a view showing a simulated image in which the ten key is exposed.

As can be seen from the comparison between FIGS. 6 and 7, the simulated image GA2 is different from the simulated image GA1 in that the simulated image GA2 includes the image simulating the ten key 27. A switching operation between the simulated images GA1 and GA2 will be discussed later.

<1-6. Operation>

Figure 8:
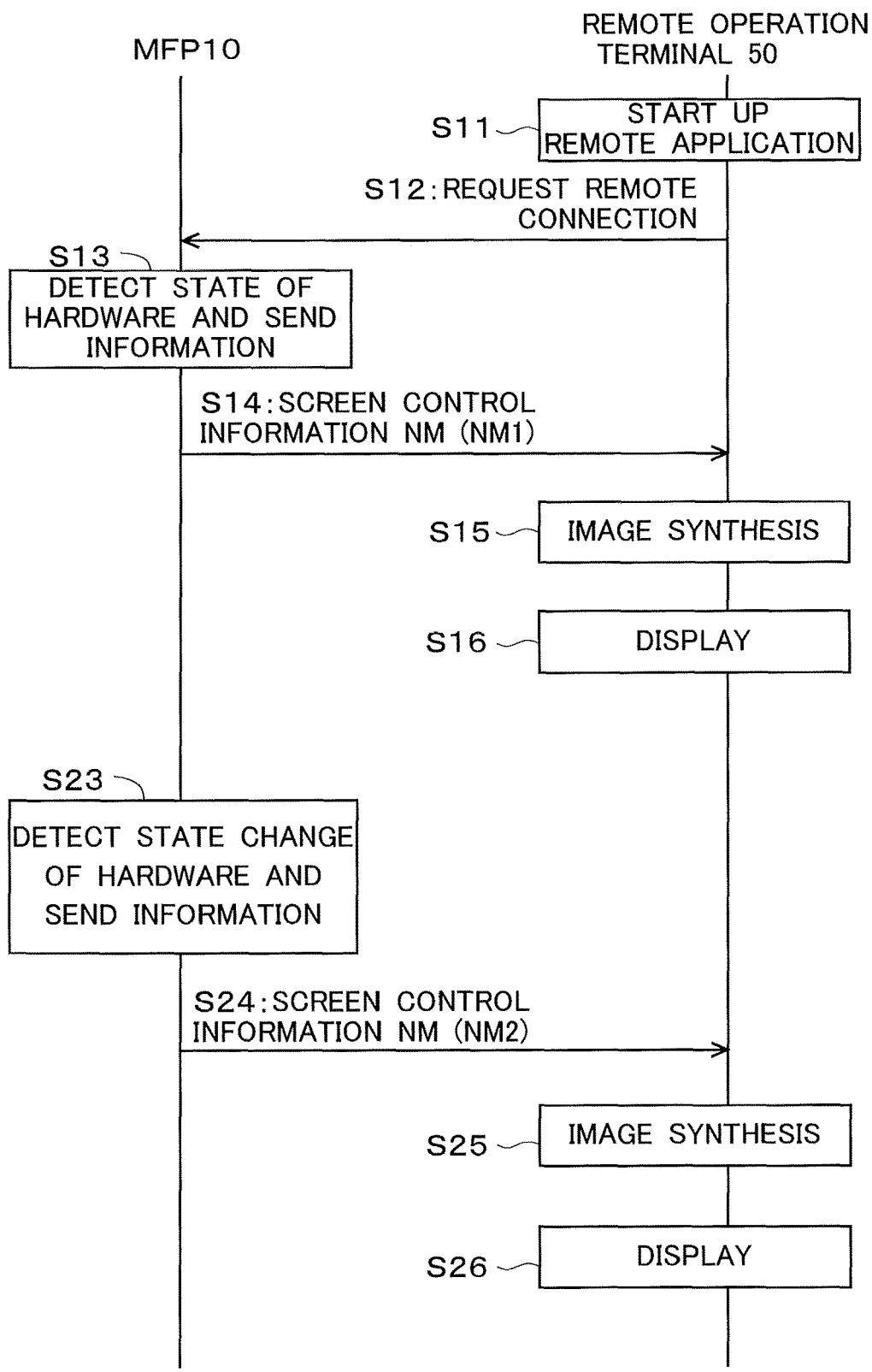
FIG. 8 is a sequence diagram showing an operation of the image forming system.

Next, an operation of the image forming system 1 will be discussed. FIG. 8 is a sequence diagram showing the operation.

When the remote operation apparatus 50 starts executing the remote application software program PG2 in Step S11, the remote operation apparatus 50 requests the image forming apparatus 10 to make remote connection (Step S12). The image forming apparatus 10 detects a state of the hardware operating member (especially the ten key 27) of the operation part 6 thereof and sends the screen control information NM on the basis of the state to the remote operation apparatus 50 (Steps S13 and S14). Specifically, when the image forming apparatus 10 detects that the ten key 27 is in the not-exposed state ST11 (see FIG. 4), the image forming apparatus 10 sends the screen control information NM (also referred to as screen control information NM1) including the information on the detected state to the remote operation apparatus 50.

When the remote operation apparatus 50 receives the screen control information NM1, the remote operation apparatus 50 generates the simulated image GA1 (Step S15). The simulated image GA1 is generated by synthesizing an image P11 simulating the main body 21 (especially the lower portion thereof) of the operation part 6 in the image forming apparatus 10 and an image P12 simulating the operation panel 23 (see FIG. 6). Further, it is assumed that the images P11 and P12 are stored in the remote operation apparatus 50 (in more detail, in the screen data storage part 55c) in advance before the operation of Step S11 starts.

Then, the remote operation apparatus 50 displays the simulated image GA1 which is generated, on the touch screen 75 (Step S16) (see FIG. 6).

An operator UB (herein, an operator of a call center) who operates the remote operation apparatus 50 can make explanation on how to operate the image forming apparatus 10 and the like by using the simulated image GA1 displayed on the touch screen 75. For example, the operator UB (the operator of the call center) can make explanation on how to operate the image forming apparatus 10 and the like to an operator UA who manipulates the operation part 6 of the image forming apparatus 10 in a distant place while watching the operation image (simulated image GA1) like the operation part 6. Particularly, the operator UB of the call center can remotely operates the image forming apparatus 10 by using the simulated image GA1 (operation image) displayed on the touch screen 75. For example, by pressing some of the buttons in the simulated image displayed on the touch screen 75, the same state as that made when the actual buttons corresponding to the pressed button (the corresponding actual buttons in the operation part 6) are pressed can be achieved.

After that, when the operator UA of the image forming apparatus 10 slides the operation panel 23 on the front side in the left direction with respect to the main body 21 on the rear surface side in the not-exposed state ST11 of FIG. 4, the ten key 27 is changed into the exposed state ST12 of FIG. 5. In response to this, the following operation will be performed.

First, in Step S23, the image forming apparatus 10 detects the state change of the hardware operating member (especially, the ten key 27) of the operation part 6 and sends the screen control information NM on the basis of the state change to the remote operation apparatus 50 (Step S24). Specifically, when the image forming apparatus 10 detects that the state of the ten key 27 has been changed from the not-exposed state ST11 (see FIG. 4) into the exposed state ST12 (see FIG. 5), the image forming apparatus 10 sends the screen control information NM (also referred to as the screen control information NM2) to the remote operation apparatus 50. The screen control information NM2 includes the information indicating that the stat of the ten key 27 in the operation panel 23 has been changed into the not-exposed state ST12.

When the remote operation apparatus 50 receives the screen control information NM2 in accordance with the state change of the ten key 27 from the not-exposed state ST11 into the exposed state ST12, the remote operation apparatus 50 generates the simulated image GA2 (Step S25). As shown in FIG. 7, the simulated image GA2 is generated by synthesizing the image P11 simulating the main body 21 (especially, the lower portion thereof) of the operation part 6 in the image forming apparatus 10, the panel displaying image P12 simulating the operation panel 23, and a front-right image P13 of the main body 21 including the ten key 27 (an image of a portion which was hidden behind the operation panel 23). The image P13 may be also represented as the key displaying image of the ten key 27. Further, besides the images P11 and P12, the image P13 is also stored in the storage part 5 55 (in more detail, in the screen data storage part 55c) inside the remote operation apparatus 50 in advance before the operation of Step S11 starts.

Then, the remote operation apparatus 50 displays the simulated image GA2 which is generated thus on the touch screen 75 (Step S26).

Thus, first, in the state before the state change of the ten key 27 in the operation part 6 of the image forming apparatus 10 (in more detail, the not-exposed state ST11) (see FIG. 4), the simulated image GA1 is displayed as an operation image on the touch screen 75 of the remote operation apparatus 50 (see FIG. 6) through the operations of Steps S11 to S16. After that, when the state of the ten key 27 is changed from the not-exposed state ST11 (see FIG. 4) into the exposed state ST12 (see FIG. 5) in response to the slide operation on the operation panel 23 by the operator, the detection part 7 (the state detection sensor 28) detects the state change (Step S23). Further, the screen control information NM2 in accordance with the state change is transmitted from the image forming apparatus 10 to the remote operation apparatus 50. Then, the remote operation apparatus 50 which receives the screen control information NM2 in response to the state change changes the content displayed on the touch screen 75 from the simulated image GA1 (see FIG. 6) to the new simulated image GA2 (see FIG. 7) in which the screen control information NM is reflected. Specifically, when the remote operation apparatus 50 receives the screen control information NM2 indicating the state change of the ten key 27 (hardware key) from the state ST11 to the state ST12, the remote operation apparatus 50 changes the display image on the touch screen 75 from the simulated image GA1 not having the ten key 27 into the simulated image GA2 having the ten key 27. In the simulated image GA2, the panel displaying image P12 and the key displaying image P13 are synthesized in the state where the panel displaying image P12 is shifted horizontally leftward with respect to the arrangement position of the panel displaying image P12 in the simulated image GA1.

By this operation, in response to the operation of the operator UA of the image forming apparatus 10, the content of the operation screen (the touch screen 75) of the remote operation apparatus 50 is changed into the content in which the state of the ten key 27 (hardware operating member) in the image forming apparatus 10 is reflected. In more detail, on the touch screen 75 of the remote operation apparatus 50, the same state as that of the operation part 6 in the image forming apparatus 10 is displayed in the operation screen. Therefore, the operator UB of the remote operation apparatus 50 can correctly recognize the state of the operation part 6 in the image forming apparatus 10 and the operability of the operator UB is thereby improved.

In more detail, in the exposed state ST12 where the operator UA can see and operate the ten key 27, the simulated image GA2 including the elements corresponding to the ten key 27 is displayed on the touch screen 75 in the remote operation apparatus 50 on the side of the operator UB. Further, in the state ST12, the operator UB of the remote operation apparatus 50 can visually recognize the image of the operation part including the element of the ten key (the simulated image of the ten key 27) and perform the same input operation using the ten key as the operator UA does by using the simulated image GA2 (in more detail, perform an input operation using the elements of the ten key in the touch screen 75). In more detail, by pressing the displayed portion of each element of the ten key in the simulated image GA2 displayed on the touch screen 75, the same state as that in which the actual button (the corresponding button of the ten key 27 of the operation part 6) corresponding to the element of the ten key is pressed can be achieved.

Thus, the operator UB (the operator of the call center or the like) of the remote operation apparatus 50 can make explanation on how to use the image forming apparatus to the operator UA thereof while watching the simulated image GA2 having the same state as the actual state of the operation part 6 which the operator UA of the image, forming apparatus 10 sees. In other words, the state of the operation part 6 in the image forming apparatus 10 matches the content displayed on the touch screen 75 in the remote operation apparatus 50.

Therefore, the operator UB can make explanation on how to use the image forming apparatus 10 while understanding the operation state by the operator UA of the image forming apparatus 10. In other words, the operator UB can achieve very high operability of the image forming system 1A. Further, the operator UA of the image forming apparatus 10 can receive easy-to-understand explanation from the operator UB of the remote operation apparatus 50 (the operator of the call center or the like). Thus, the image forming system 1A is a system which is useful for both the operator UB and the operator UA.

After that, when the operator UA of the image forming apparatus 10 slidingly moves the operation panel 23 rightward from the exposed state ST12 shown in FIG. 5 and the operation panel 23 is returned to the not-exposed state ST11 shown in FIG. 4, the simulated image GA1 is now displayed on the touch screen 75 of the remote operation apparatus 50.

Specifically, the image forming apparatus 10 detects the state change of the hardware operating member (especially, the ten key 27) of the operation part 6 thereof and sends the screen control information NM on the basis of the state change to the remote operation apparatus 50. Specifically, the image forming apparatus 10 which detects that the state of the ten key 27 has been changed from the exposed state ST12 into the not-exposed state ST11 sends the screen control information NM (also referred to as screen control information NM3) including the information on the state change to the remote operation apparatus 50. Further, the screen control information NM (NM1, NM2, NM3) is also referred to as control information for screen synthesis (screen synthesis control information).

When the remote operation apparatus 50 receives the screen control information NM3 in accordance with the state change from the state ST12 of the hardware key into the state ST11 thereof, the remote operation apparatus 50 generates the simulated image GA1. Then, the remote operation apparatus 50 displays the simulated image GA1 not having the ten key 27 on the touch screen 75.

Thus, when the operator performs a slide operation of the operation panel 23 and the state of the ten key 27 is changed again from the exposed state ST12 (see FIG. 5) into the not-exposed state ST11 (see FIG. 4), the detection part 7 (the state detection sensor 28) detects the state change. Then, the screen control information NM3 in accordance with the state change (the screen control information indicating the state change from the state ST12 to the state ST11) is transmitted from the image forming apparatus 10 to the remote operation apparatus 50. In response to the state change, the remote operation apparatus 50 which receives the screen control information NM3 changes the content displayed on the touch screen 75 from the simulated image GA2 having the ten key 27 (see FIG. 7) to the original simulated image GA1 (the simulated image not having the ten key 27) in which the screen control information NM3 is reflected (see FIG. 6). In the above-discussed not-exposed state ST11, the simulated image GA1 not including the elements corresponding to the ten key 27 is displayed on the touch screen 75 of the remote operation apparatus 50 on the side of the operator UB.

By this operation, in response to the operation of the operator UA of the image forming apparatus 10, the content of the operation screen (the touch screen 75) of the remote operation apparatus 50 is changed into the content in which the state of the ten key 27 (hardware operating member) in the image forming apparatus 10 is reflected. Therefore, the operator UB of the remote operation apparatus 50 can correctly recognize the state of the operation part 6 in the image forming apparatus 10 and the operability of the operator UB is thereby improved.

In more detail, in the not-exposed state ST11, the operator UA of the image forming apparatus 10 cannot see nor operate the ten key 27. Further, in the not-exposed state ST11, the operator UB of the remote operation apparatus 50 can visually recognize the image of the operation part not having the ten key (cannot visually recognize the ten key) and cannot perform the input operation using the ten key. In other words, the operator UB cannot see the ten key 27 which the operator UA cannot see and cannot perform the operation which the operator UA cannot perform. Thus, it is possible to avoid the mismatch between the operators UA and UB (in other words, the mismatch between the image forming apparatus 10 and the remote operation apparatus 50).

<2. The Second Preferred Embodiment>

The second preferred embodiment is a variation of the first preferred embodiment. Hereinafter, discussion will be made, centering on the difference between the first and second preferred embodiments.

Figure 9:
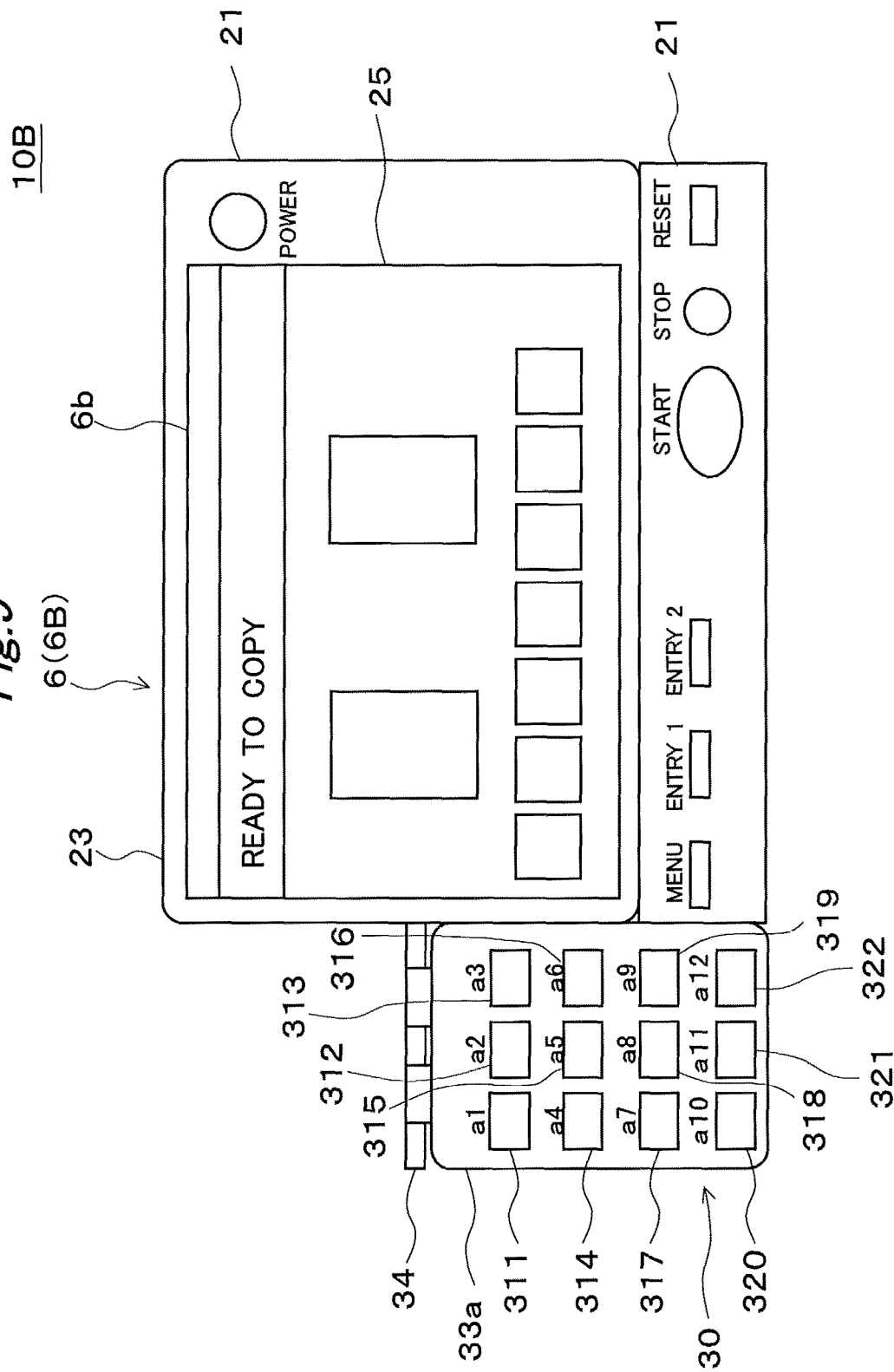
FIGS. 9 and 10 are plan views each showing an operation part of an image forming apparatus in accordance with a second preferred embodiment of the present invention.
Figure 10:
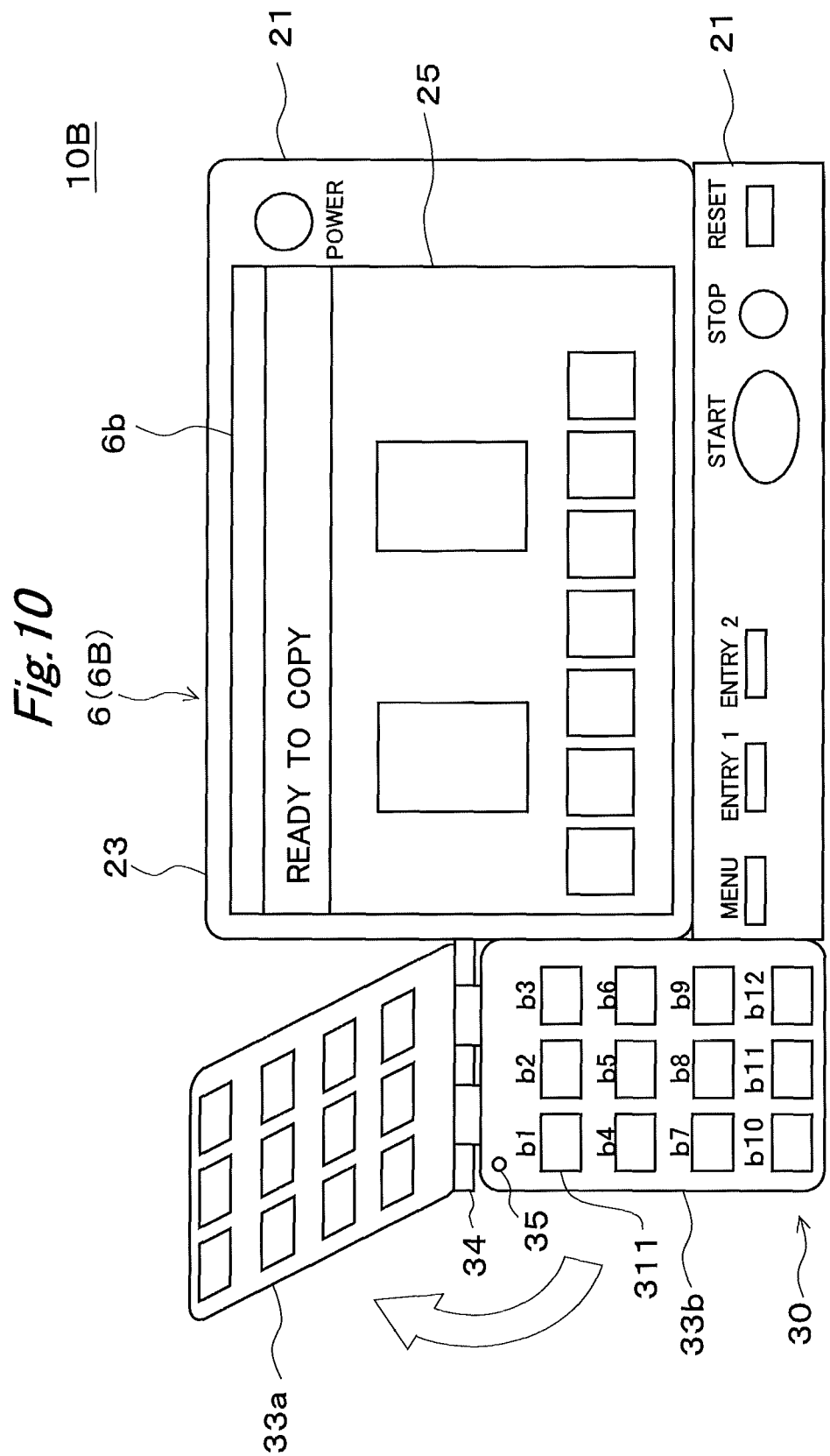

FIGS. 9 and 10 are plan views each showing a detailed configuration of an operation part 6 (6B) of an image forming apparatus 10 (10B) in accordance with the second preferred embodiment of the present invention.

As shown in these figures, in an image forming system 1 (1B) of the second preferred embodiment, the operation part 6B of the image forming apparatus 10B further has a flip-type (open/close-type) destination designating part 30 besides the above constituents. The destination designating part 30 is provided on the left side of the main body 21. The destination designating part 30 has a plurality of (in detail, twelve) destination designating buttons 31 (311 to 322), two destination name sheets 33 (33a and 33b) describing destination numbers corresponding to these buttons, a rotation axis 34, and a state detection sensor 35.

In the destination name sheet 33a, described are twelve destination names "a1" to "a12" corresponding to the twelve buttons 311 to 322. Further, in the destination name sheet 33b, described are twelve destination names "b1" to "b12" corresponding to the twelve buttons 311 to 322.

In FIG. 9, the upper destination name sheet 33a is superposed on the lower destination name sheet 33b. One of the two destination name sheets 33, i.e., the (upper) destination name sheet 33a, can be turned about the rotation axis 34 which extends in the left-and-right direction. The operator UA can turn the destination name sheet 33a about the rotation axis 34 from the state shown in FIG. 9, causing the destination name sheet 33a to be inverted and moved upward (see FIG. 10). In summary, the operator UA can "flip" the destination name sheet 33a. The destination name sheet 33a may be also represented as a sheet member to be flipped. Further, the other destination name sheet (lower sheet) 33b is fixed to a rear-side base member (not shown) of the destination designating part 30.

The destination name sheets 33a and 33b are each provided with holes at the positions corresponding to the twelve buttons 311 to 322. Before the flip operation of the destination name sheet 33a, the buttons 311 to 322 penetrate through the respective holes of the destination name sheets 33a and 33b, to be exposed (see FIG. 9). On the other hand, after the flip operation of the destination name sheet 33a, the buttons 311 to 322 penetrate through the respective holes of the lower destination name sheet 33b, to be exposed (see FIG. 10).

In a state ST21 shown in FIG. 9, in other words, before the destination name sheet 33a is turned (flipped), the twelve destination names "a1" to "a12" described on the destination name sheet 33a correspond to the twelve buttons 311 to 322, respectively. In other words, in the state ST21, a first function group (a plurality of destination designating functions relating to the plurality of destination names "a1" to "a12") is assigned to the plurality of buttons 311 to 322. For example, by pressing the button 311, the destination having the destination name "a1" can be designated.

On the other hand, in a state ST22 shown in FIG. 10, in other words, after the destination name sheet 33a is turned (flipped), the twelve destination names "b1" to "b12" described on the destination name sheet 33b correspond to the twelve buttons 311 to 322, respectively. In other words, in the state ST22, a second function group (a plurality of destination designating functions relating to the plurality of destination names "b1" to "b12") is assigned to the plurality of buttons 311 to 322. For example, by pressing the button 311, the destination having the destination name "b1" can be designated.

Thus, the operator UA can change the assigned functions of the plurality of buttons 31 by turning (flipping) the destination name sheet 33a. For this reason, the destination name sheet 33a may be also represented as a hardware operating member for changing the assigned functions.

The state detection sensor 35 is a sensor for detecting the state of the destination name sheet 33a. The state detection sensor 35 is a constituent element of the detection part 7 and a sensor for detecting a state change (between the above two states ST21 and ST22) of the destination name sheet 33a.

The state detection sensor 35 is, for example, a mechanical switch having the same structure as the above-described state detection sensor 28. In the state ST21, the front end side of the moving member of the mechanical switch is pressed by a rear surface of the destination name sheet 33a. On the other hand, when the destination name sheet 33a is turned (flipped) and the state of the destination name sheet 33a is changed into the state ST22, the contact between the front end of the mechanical switch and the rear surface of the destination name sheet 33a is released and the moving member of the mechanical switch is moved frontward by the urging force. The mechanical switch changes the two states into two different electrical signals (HI signal and LO signal), respectively, and the electrical signal is transferred to the controller 9 of the image forming apparatus 10B. The image forming apparatus 10B can thereby acquire the state information of the destination name sheet 33a.

An operation in accordance with the second preferred embodiment is the same as that in the first preferred embodiment (see FIG. 8). The display images on the touch screen 75 and the like, however, are different from those in the first preferred embodiment. Hereinafter, discussion will center on the differences.

Figure 11:
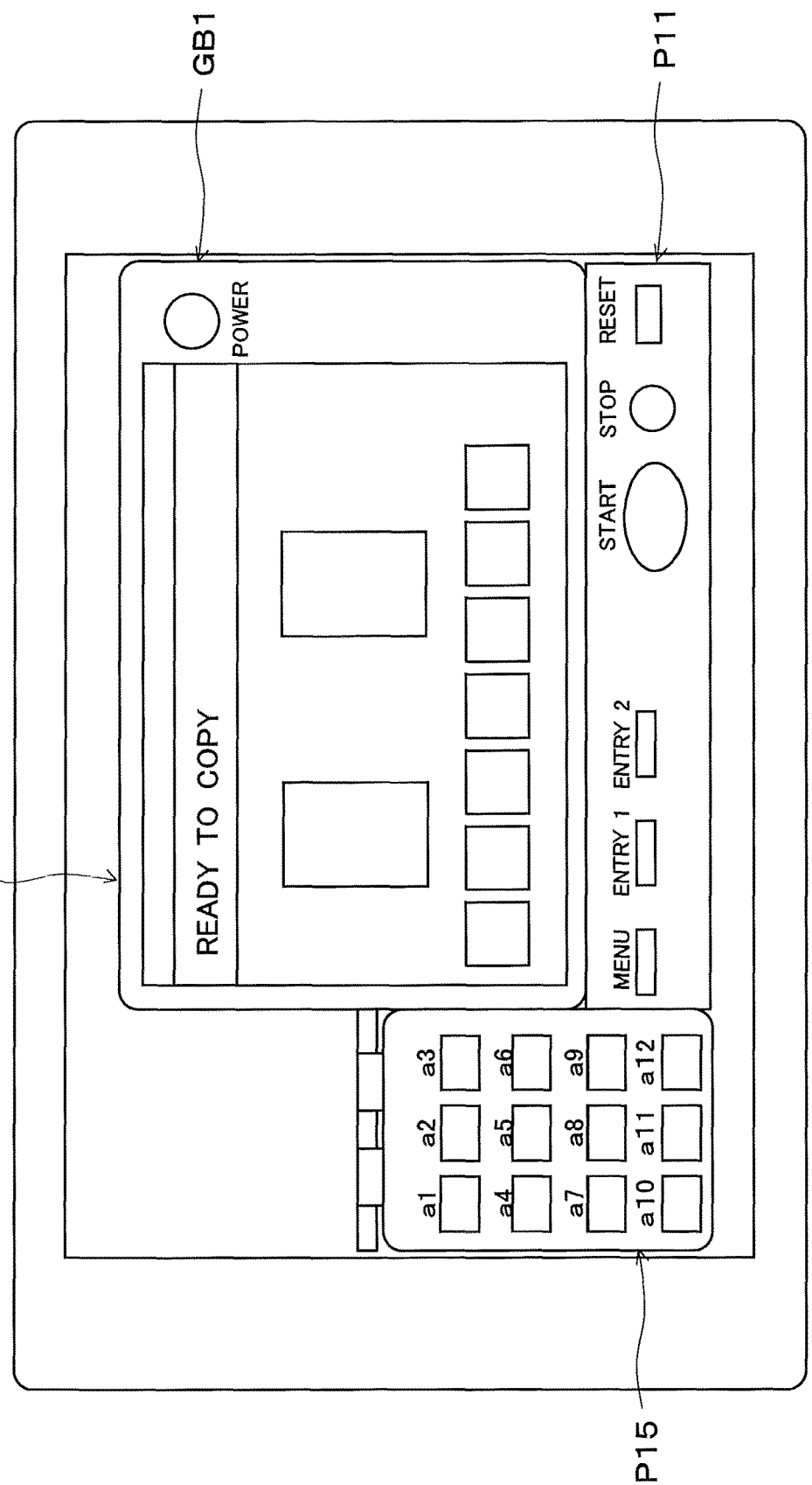
FIG. 11 is a view showing an exemplary display (corresponding to FIG. 9) in the remote operation apparatus.

Specifically, in Steps S11 to S16, in response to the state ST21 (see FIG. 9) of the destination designating part 30 (in more detail, the destination name sheet 33a) of the operation part 6B in the image forming apparatus 10B, a simulated image GB1 (see FIG. 11) is displayed as the operation image on the touch screen 75 of the remote operation apparatus 50 (50B).

Herein, the simulated image GB1 is an image having the destination names "a1" to "a12" in the destination name sheet 33a, i.e., an image generated by synthesizing the image P11, the panel displaying image P12, and a display image P15 of the destination designating part. The image P15 is a simulated image indicating the state where the twelve destination names "a1" to "a12" described in the destination name sheet 33a correspond to the twelve buttons 311 to 322. The image P15 may be also represented as a correspondence displaying image indicating a correspondence between the plurality of buttons 311 to 322 and the first function group.

Figure 12:
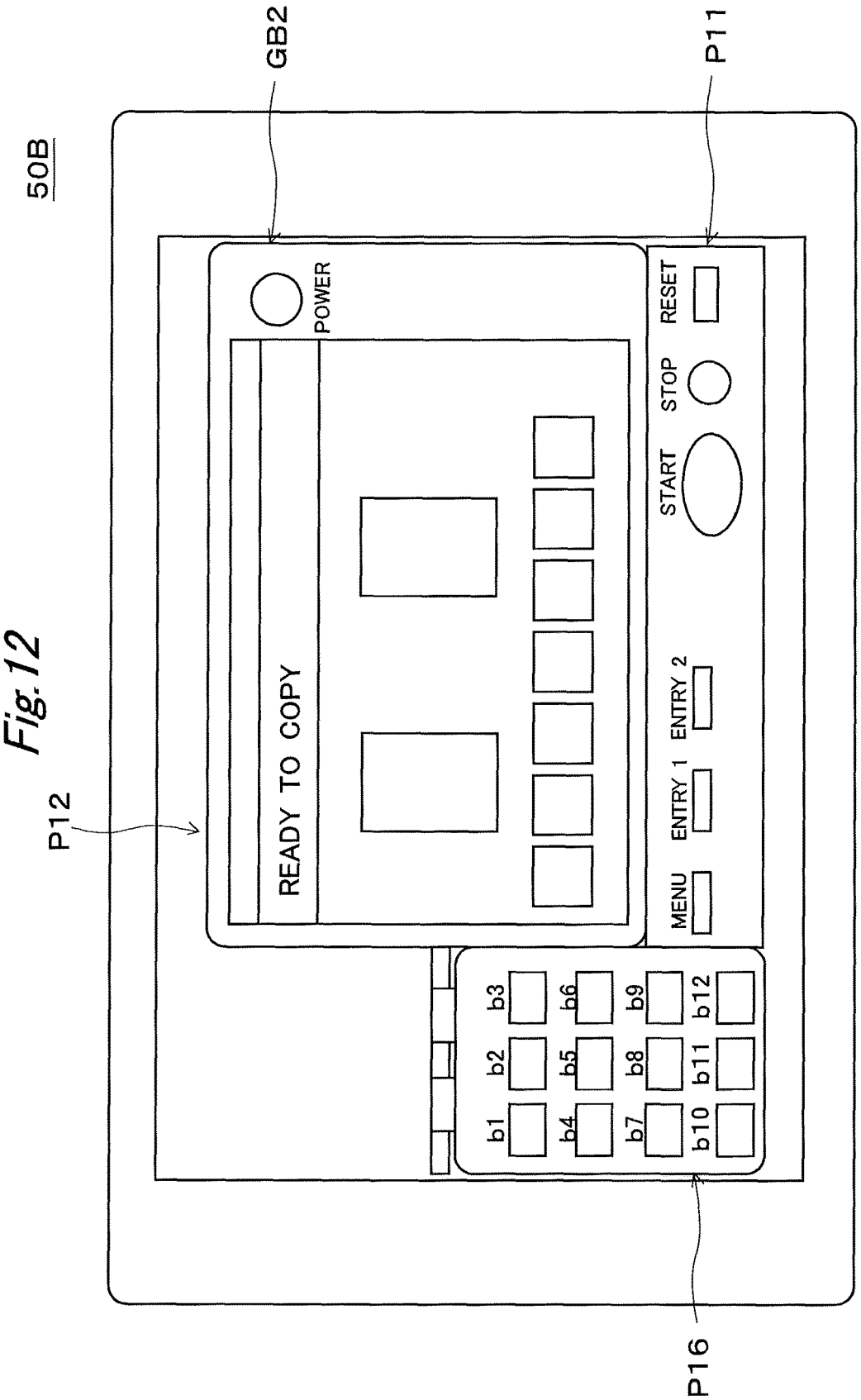
FIG. 12 is a view showing another exemplary display (corresponding to FIG. 10) in the remote operation apparatus.

After that, when the state of the destination designating part 30 (in more detail, the destination name sheet 33a) is changed from one of the two state, i.e., the state ST21, into the other state ST22 (see FIG. 10) in response to the flip operation of the destination name sheet 33a by the operator, the detection part 7 (the state detection sensor 35) detects this state change (Step S23). Further, screen control information NM2 (NM22) in accordance with this state change is transmitted from the image forming apparatus 10B to the remote operation apparatus 50B (Step S24). The screen control information NM22 is information indicating the state change of the destination designating part 30 from the state ST21 to the state ST22. Then, in response to the state change, the remote operation apparatus 50B which receives the screen control information NM22 changes the content displayed on the touch screen 75 from the simulated image GB1 (see FIG. 11) to a new simulated image GB2 (see FIG. 12) in which the screen control information NM22 is reflected (Steps S25 and S26).

Herein, the simulated image GB2 (see FIG. 12) is an image having the destination names "b1" to "b12" in the destination name sheet 33b, i.e., an image generated by synthesizing the image P11, the panel displaying image P12, and a display image P16 of the destination designating part. The image P16 is a simulated image indicating the state where the twelve destination names "b1" to "b12" described in the destination name sheet 33b correspond to the twelve buttons 311 to 322. The image P16 may be also represented as a correspondence displaying image indicating a correspondence between the plurality of buttons 311 to 322 and the second function group.

Further, over a predetermined period in response to the flip operation of the destination name sheet 33a by the operator (for example, for several seconds immediately after the flip operation), part of the simulated image GB2 (in more detail, a portion corresponding to the image P16 or the like) flashes. By this operation, the operator UB is clearly notified that the assigned functions of the plurality of buttons 311 to 322 are changed and can more reliably understand the state change of the operation part 6B (the destination designating part 30 and the like). Further, this is only one example and a moving image (animation) representing the flip operation of the destination name sheet 33a may be displayed in response to the flip operation.

After that, conversely, when the operator UA moves the destination name sheet 33a downward to the original position, the image forming apparatus 10B sends screen control information NM3 (NM32) in accordance with the state change from the state ST22 of the hardware key into state ST21 to the remote operation apparatus 50B. When the remote operation apparatus 50B receives the screen control information NM3 (NM32), the remote operation apparatus 50B displays the simulated image GB1 on the touch screen 75. Further, also in this case, it is preferable to perform flashing or the like in response to the flip operation.

Thus, in response to the flip operation by the operator UA of the image forming apparatus 10B, the content of the operation screen (the touch screen 75) of the remote operation apparatus 50B is changed to a content in which the state of the destination name sheet 33a (hardware operating member) in the image forming apparatus 10B is reflected (Step S26 and the like). By this operation, the operator UB of the remote operation apparatus 50B (the operator of the call center or the like) can make explanation on how to operate the image forming apparatus to the operator UA thereof while watching the simulated image GB2 having the same state as the actual state of the operation part GB which the operator UA of the image forming apparatus 10B sees. Therefore, the same effect as that of the first preferred embodiment can be produced. Particularly, it is possible to reliably understand the change of the assigned destinations (the change of the assigned contents for these buttons) and the like in response to the flip operation in the destination designating part 30.

<3. The Third Preferred Embodiment>

The third preferred embodiment is a variation of the first preferred embodiment. Hereinafter, discussion will be made, centering on the difference between the first and third preferred embodiments.

Figure 13:
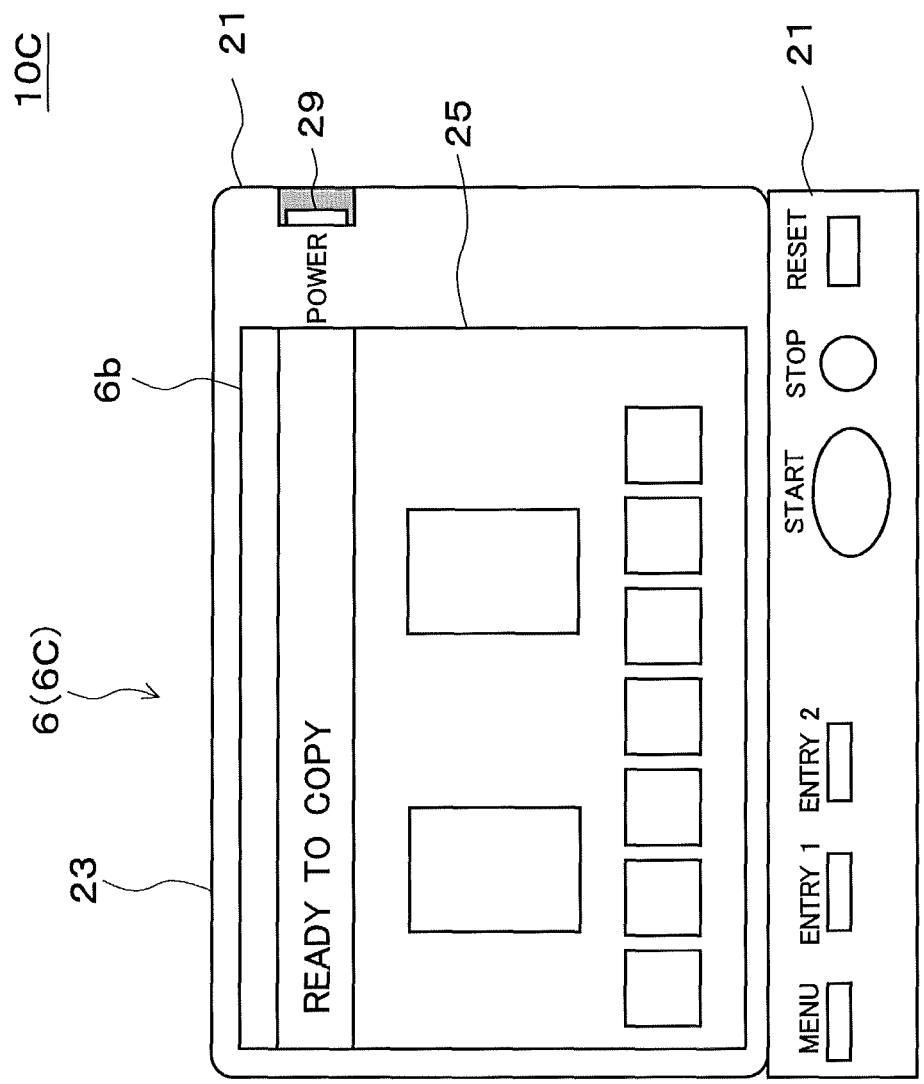
FIGS. 13 and 14 are plan views each showing an operation part of an image forming apparatus in accordance with a third preferred embodiment of the present invention.
Figure 14:
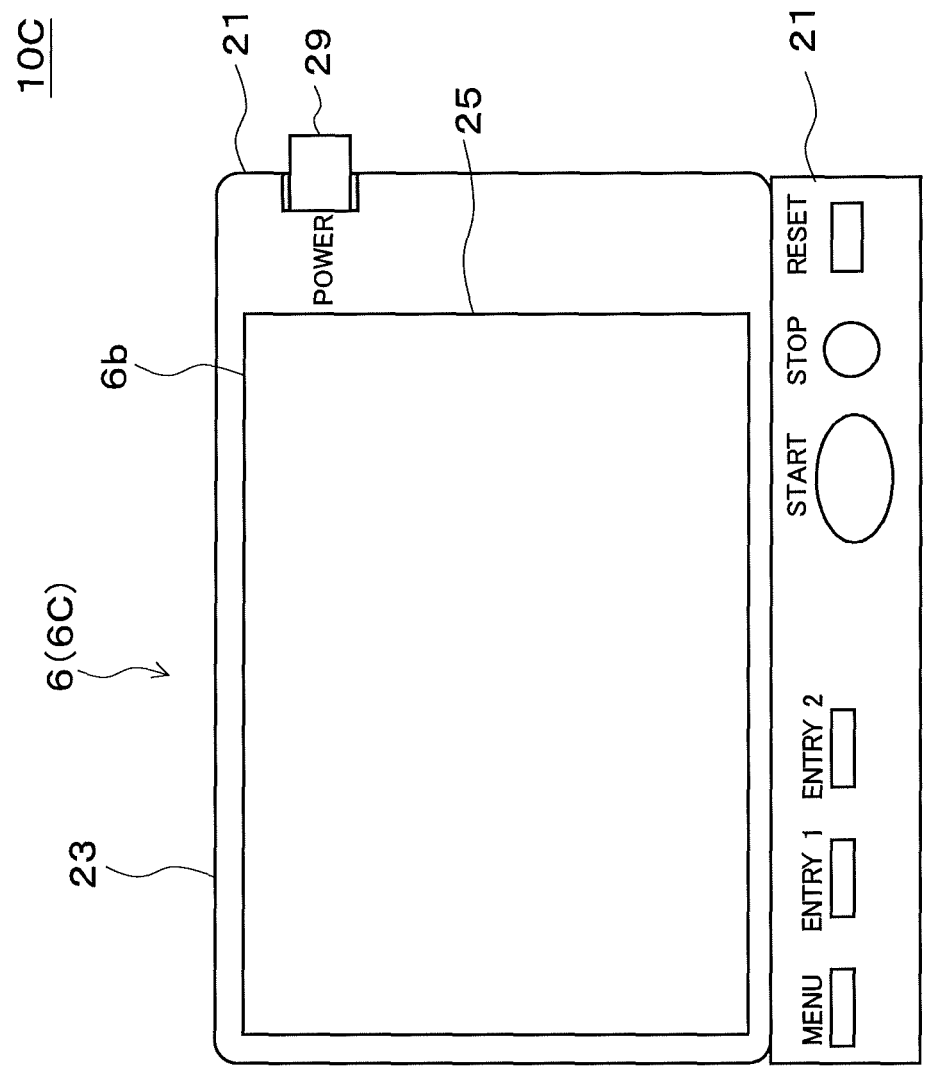

FIGS. 13 and 14 are plan views each showing a detailed configuration of an operation part 6 (6C) of an image forming apparatus 10 (10C) in accordance with the third preferred embodiment of the present invention.

As shown in these figures, in an image forming system 1 (1C) of the third preferred embodiment, the operation part 6C of the image forming apparatus 10C further has a mechanical push button switch (in detail, a position keeping switch for inverting an ON state and an OFF state at every pressing) as a power button (in more detail, a sub power button) 29.

A state where the power button 29 is pressed leftward (see FIG. 13) corresponds to a power-on state. On the other hand, a state where the pressing of the power button 29 is released by pressing the button again and the power button 29 protrudes from a right end side of the main body 21 (see FIG. 14) corresponds to a power-off state.

In a power-on state ST31 (a state before a power-off operation) shown in FIG. 13, one of various menu screens is displayed on the touch screen 25 and various operations can be received. For example, various setting operations and the like relating to a copy operation, a scan operation, and the like can be received.

On the other hand, in a power-off state ST32 (a state after the power-off operation) shown in FIG. 14, the touch screen 25 is lit off and the operations using the touch screen 25 cannot be received. For example, various setting operations and the like relating to the copy operation, the scan operation, and the like cannot be received. In the power-off state ST32 (exactly, also referred to as a sleep state), however, a network connection function is active and a remote connection function (a remote operation function using the remote operation apparatus 50 (50C) and the like) is also active.

The power button 29 also serves as a state detection sensor for detecting a pressed state of the power button 29 itself. The detection part 7 of the image forming apparatus 10C acquires state information (the power-on state ST31 or the power-off state ST32) of the power button 29 on the basis of the pressed state of the power button 29. In other words, the detection part 7 detects a state change between the power-on state ST31 and the power-off state ST32.

An operation in accordance with the third preferred embodiment is the same as that in the first preferred embodiment (see FIG. 8). The display images of the touch screen 75 and the like, however, are different from those in the first preferred embodiment. Hereinafter, discussion will center on the differences.

Figure 15:
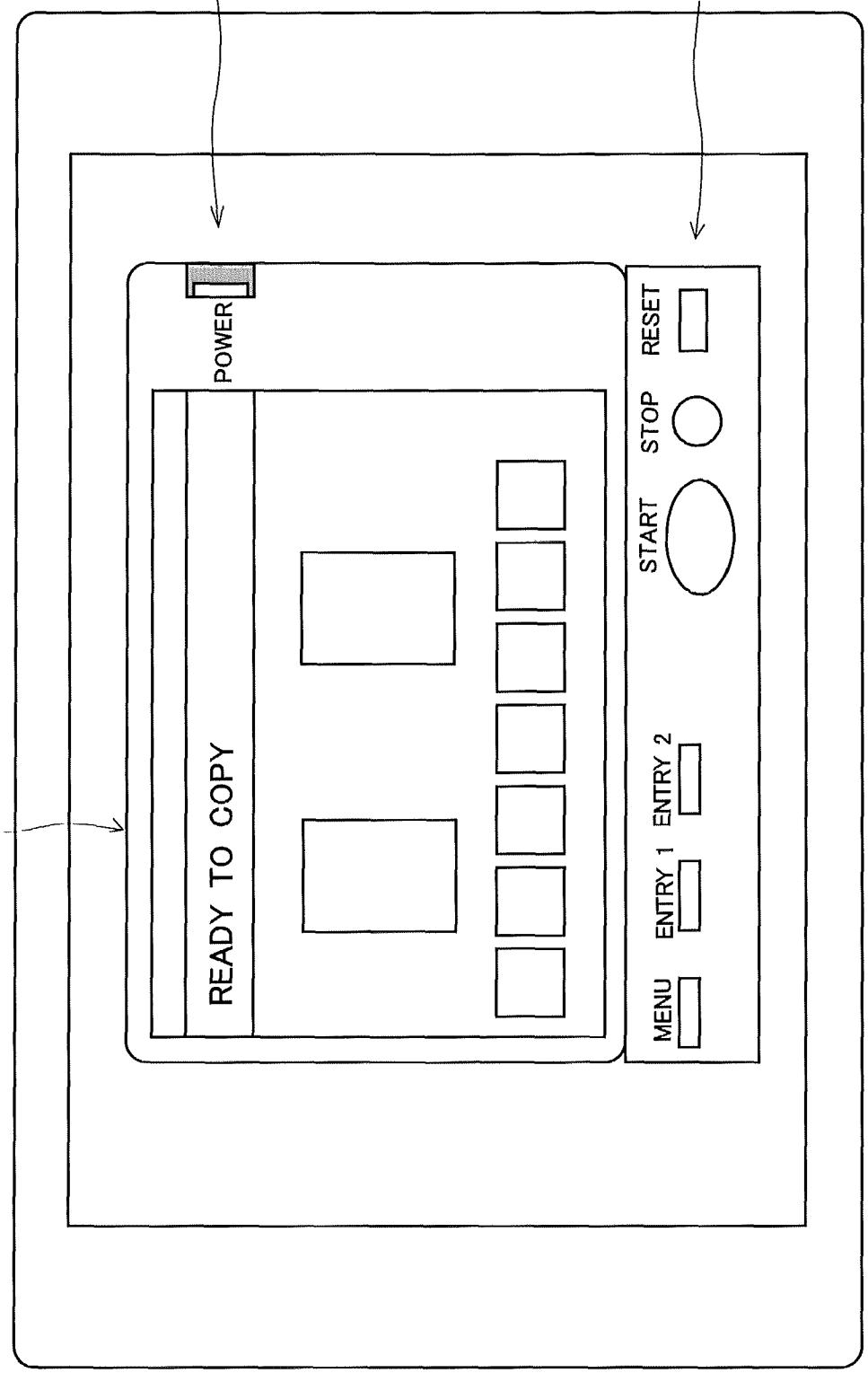
FIG. 15 is a view showing an exemplary display (corresponding to FIG. 13) in the remote operation apparatus.

Specifically, in Steps S11 to S16, in response to the power-on state ST31 (see FIG. 13) of the power button 29 of the operation part 6C in the image forming apparatus 10C, a simulated image GC1 (see FIG. 15) is displayed as the operation image on the touch screen 75 of the remote operation apparatus 50C. Herein, the simulated image GC1 is an image generated by synthesizing the image P11 and the panel displaying image P12. In the image P12, one of various menu screens and the like is displayed.

Figure 16:
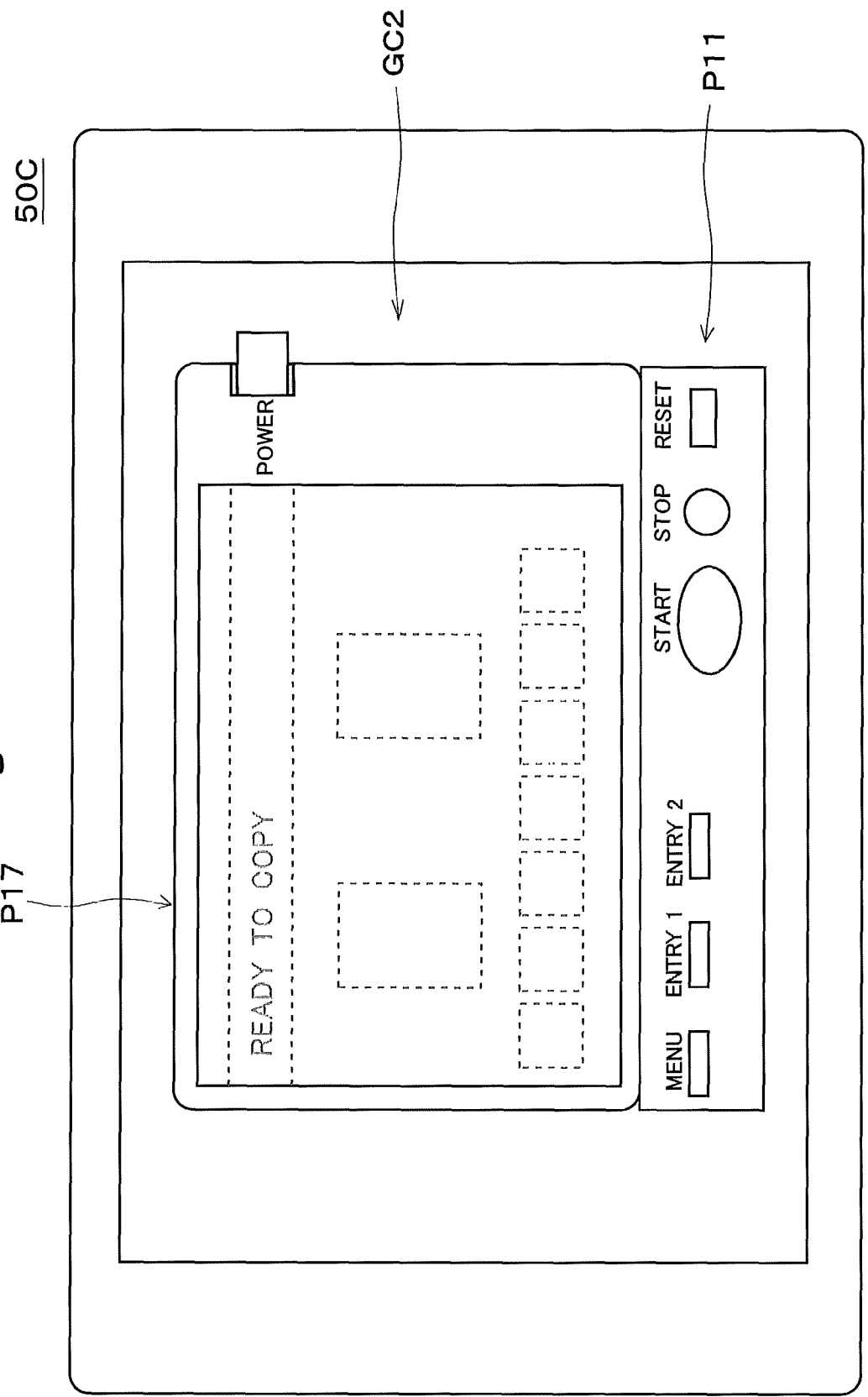
FIG. 16 is a view showing another exemplary display (corresponding to FIG. 14) in the remote operation apparatus.

After that, when the state of the power button 29 is changed from the power-on state ST31 into the power-off state ST32 (see FIG. 14) in response to a pressing operation of the power button 29 by the operator, the detection part 7 detects this state change (Step S23). Further, screen control information NM2 (NM23) in accordance with this state change is transmitted from the image forming apparatus 10C to the remote operation apparatus 50C (Step S24). The screen control information NM23 is information indicating the state change of the power button 29 from the power-on state ST31 to the power-off state ST32. Then, in response to the state change, the remote operation apparatus 50C which receives the screen control information NM23 changes the content displayed on the touch screen 75 from the simulated image GC1 (see FIG. 15) to a new simulated image GC2 in which the screen control information NM23 is reflected (see FIG. 16) (Steps S25 and S26).

Herein, the simulated image GC2 (see FIG. 16) is an image in which a portion corresponding to the touch screen 25 is grayed out, i.e., an image generated by synthesizing the image P11 and a panel displaying image P17. In the image P17, the portion (partial image) corresponding to the touch screen 25 is grayed out (dimmed). This indicates that the portion corresponding to the touch screen 25 is inoperative.

Further, after that, conversely, when a power-on operation is performed, screen control information NM3 (NM33) in accordance with a state change from the power-off state ST32 to the power-on state ST31 is transmitted. Then, when the remote operation apparatus 50C receives the screen control information NM33 from the image forming apparatus 10C, the remote operation apparatus 50C displays the simulated image GC1 on the touch screen 75 again.

Thus, in response to the power-off operation using the power button 29 in the image forming apparatus 10C, the content of the operation screen (the touch screen 75) of the remote operation apparatus 50C is changed to a content in which the state of the power button 29 in the image forming apparatus 10C is reflected (Step S26 and the like). By this operation, the operator UB of the remote operation apparatus 50C (the operator of the call center or the like) can make explanation on how to operate the image forming apparatus to the operator UA thereof while watching the simulated image GC2 having the same state as the actual state of the operation part 6C which the operator UA of the image forming apparatus 10C sees. Therefore, the same effect as that of the first preferred embodiment can be produced. Particularly, in the power-off state ST32 in response to the operation on the power button 29, the touch screen 25 in the image forming apparatus 10C is lit off and inoperative and the portion of the display image in the remote operation apparatus 50C corresponding to the touch screen 25 is also inoperative. Therefore, both the operators UA and UB visually recognize in common that any menu operation using the touch screen 25 (or the like screen) cannot be made, and commonly cannot make any menu operation. For this reason, it is possible to avoid the mismatch between the operators UA and UB (in other words, the mismatch between the image forming apparatus 10C and the remote operation apparatus 50C).

Though the case has been discussed where the portion of the image P17 corresponding to the touch screen 25 is grayed out in the above-discussed preferred embodiment, this is only one exemplary case. For example, the portion (partial image) of the image P17 corresponding to the touch screen 25 may be blacked out (displayed in black). By this displaying method, it can be indicated that the portion corresponding to the touch screen 25 is also inoperative (in other words, the touch screen 25 is inoperative).

Further, though the case has been discussed where both the image indicating the power-off state of the power button 29 and the image indicating the inoperative state of the touch screen 25 are displayed in the image P17 in the above-discussed preferred embodiment, this is only one exemplary case. For example, only one of these images (particularly, the image indicating the inoperative state of the touch screen 25) may be displayed in the image P17.

Furthermore, though the case has been discussed where the position keeping switch is used as the power button 29 in the above-discussed preferred embodiment, this is only one exemplary case. For example, an automatic reset switch which switches on only a period while the switch is pressed may be used as the power button 29. In this case, the image indicating the inoperative state of the touch screen 25 has to be displayed in the image P17.

<4. The Fourth Preferred Embodiment>

The fourth preferred embodiment is a variation of the first preferred embodiment. Hereinafter, discussion will be made, centering on the difference between the first and fourth preferred embodiments.

Figure 17:
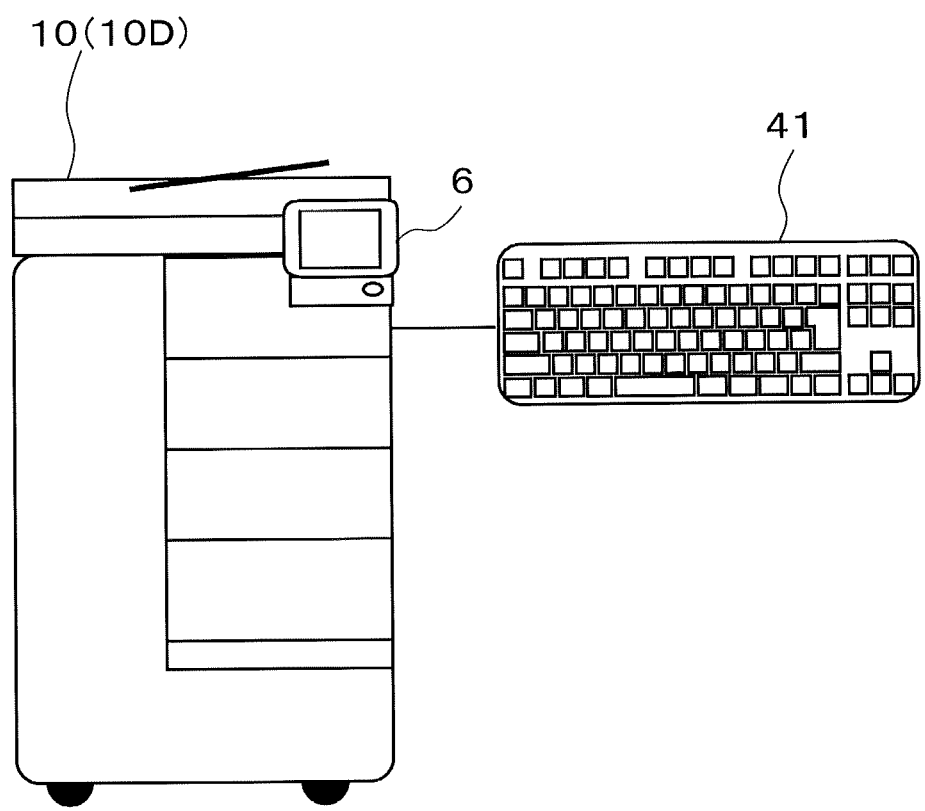
FIG. 17 is a view showing an image forming apparatus connected to an external keyboard in accordance with a fourth preferred embodiment of the present invention.
Figure 18:
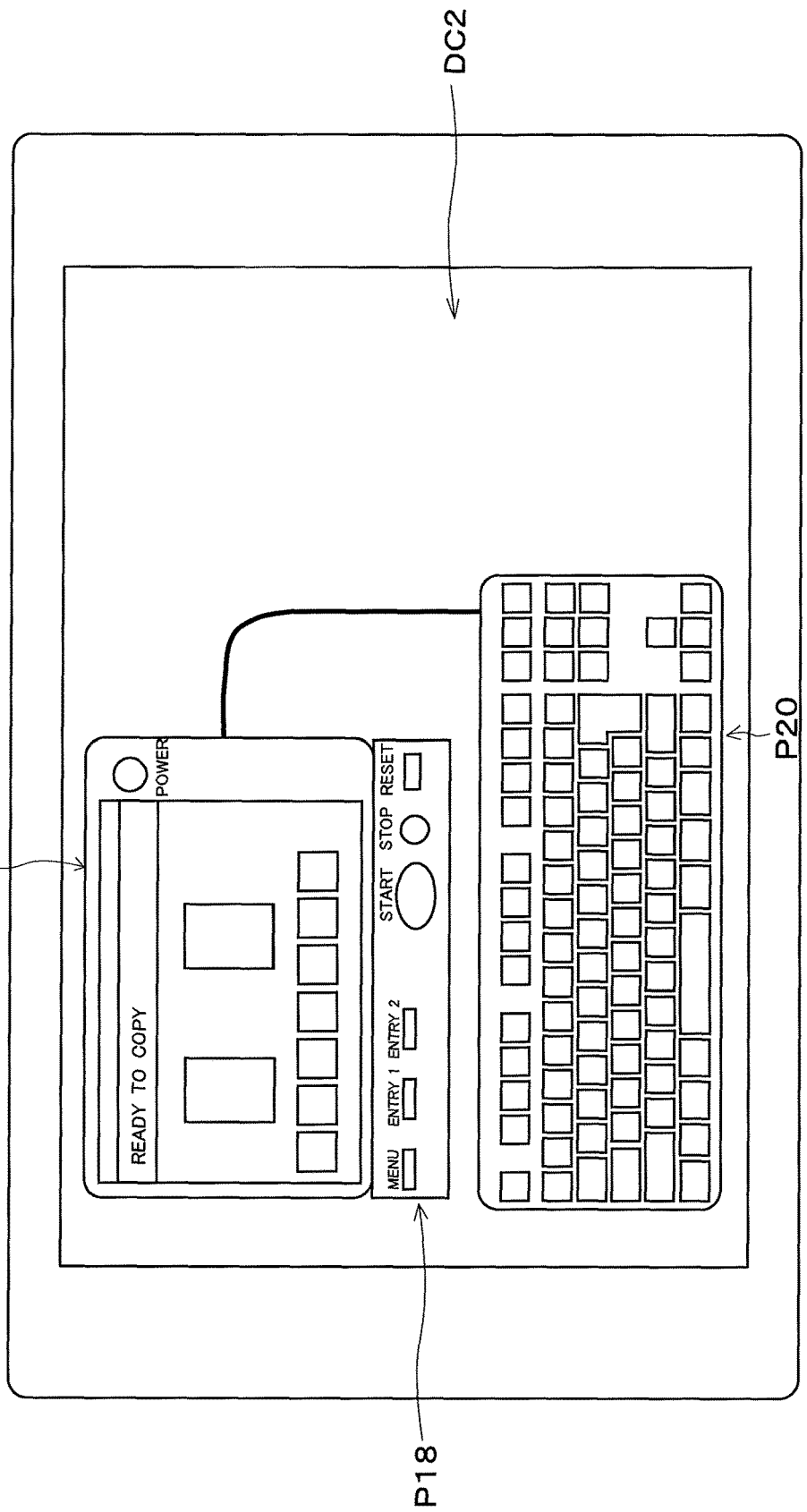
FIG. 18 is a view showing an exemplary display (corresponding to FIG. 17) in the remote operation apparatus.

In the fourth preferred embodiment, an external keyboard 41 can be connected to an image forming apparatus 10 (10D). In the fourth preferred embodiment, a case will be discussed where in response to the connection of the external keyboard 41 to the image forming apparatus 10D (see FIG. 17), an operation screen relating the external keyboard 41 is also displayed on the touch screen 75 of the remote operation apparatus 50 (50D) (see FIG. 18).

Specifically, in Steps S11 to S16, in response to a state ST41 where the external keyboard 41 is not connected to the image forming apparatus 10D, an image GD1 like the image GA1 of FIG. 6 is displayed as the operation image on the touch screen 75 of the remote operation apparatus 50D. In this state ST41, any input operation using the external keyboard 41 is not performed, and any input operation using a simulated image of the external keyboard 41 is not performed, either.

After that, it is assumed that the operator connects the external keyboard 41 to the image forming apparatus 10D (for example, a USB connection terminal of the external keyboard 41 is connected to a USB connection port of the image forming apparatus 10D).

When the state is changed from the non-connection state ST41 of the external keyboard 41 to a connection state ST42 (see FIG. 17) of the external keyboard 41 in response to this connecting operation, the detection part 7 detects this state change (Step S23).

Further, screen control information NM2 (NM24) in accordance with this state change is transmitted from the image forming apparatus 10D to the remote operation apparatus 50D (Step S24). The screen control information NM24 is information indicating the state change from the non-connection state ST41 of the external keyboard 41 to the connection state ST42 thereof. The screen control information NM24 includes model number information of the connected external keyboard 41. Then, in response to this state change, the remote operation apparatus 50D which receives the screen control information NM24 changes the content displayed on the touch screen 75 from the simulated image GD1 to a new simulated image GD2 (see FIG. 18) in which the screen control information NM24 is reflected (Steps S25 and S26).

In the state ST42 where the external keyboard 41 is connected to the image forming apparatus 10D (see FIG. 17), the simulated image GD2 (see FIG. 18) including an image of the external keyboard 41 is displayed.

The simulated image GD2 (see FIG. 18) also includes a keyboard image P20 corresponding to the external keyboard 41 and is generated by synthesizing an image P18, a panel displaying image P19, and the keyboard image P20. The images P18 and P19 are generated as reduced images of the images P11 and P12, respectively. Further, in the screen data storage part 55c, simulated images (candidate images) of a plurality of external keyboards 41 are also stored in advance.

It is preferable to determine an image corresponding to the external keyboard 41 actually connected to the image forming apparatus 10D as the s simulated image P20 of the external keyboard 41 which is synthesized in the simulated image GD2. In more detail, the image corresponding to the actually-connected external keyboard 41 may be selected out of the plurality of candidate images stored in the screen data storage part 55c, on the basis of the model number information in the screen control information NM24. Particularly, it is preferable to display a keyboard image having the same keyboard layout as that of the actually-connected external keyboard 41 as the simulated image P20 in the simulated image GD2.

In this state ST42, the operator UA of the image forming apparatus 10D can perform an input operation using the external keyboard 41, and the operator UB of the remote operation apparatus 50D can perform an input operation using the simulated image (operation image) P20 of the external keyboard 41. For example, when the operator UB presses each of constituent element images (keyboard element images corresponding to the keys (such as "a" and the like) of the external keyboard 41) in the simulated image P20 of the external keyboard in the simulated image GD2, the same state as that where an input through the corresponding key of the external keyboard 41 is made is achieved.

After that, conversely, when the connection of the external keyboard 41 is released, screen control information NM3 (NM34) in accordance with a state change from the connection state ST42 of the external keyboard 41 to the non-connection state ST41 is transmitted. When the remote operation apparatus 50D receives the screen control information NM34 from the image forming apparatus 10D, the remote operation apparatus 50D displays the simulated image GD1 on the touch screen 75 again.

Thus, in response to the connection/disconnection of the external keyboard 41 of the operation part 6 in the image forming apparatus 10D, the content of the operation screen (the touch screen 75) of the remote operation apparatus 50D is changed to a content in which the connection or the disconnection of the external keyboard 41 is reflected (Step S26 and the like). By this operation, the operator UB of the remote operation apparatus 50D (the operator of the call center or the like) can make explanation on how to operate the image forming apparatus to the operator UA thereof while watching the simulated image GD2 having the same state as the actual state of the operation part 6 which the operator UA of the image forming apparatus 10D uses. Therefore, the operator UB of the remote operation apparatus 50D can correctly recognize the state of the operation part 6 in the image forming apparatus 10D and the operability of the operator UB is thereby improved.

<5. The Fifth Preferred Embodiment>

The fifth preferred embodiment is a variation of the first preferred embodiment. Hereinafter, discussion will be made, centering on the difference between the first and fifth preferred embodiments.

FIG. 19 is a plan view showing a detailed configuration of an operation part 6 (6E) of an image forming apparatus 10 (10E) in accordance with the fifth preferred embodiment of the present invention.

As shown in FIG. 19, in an image forming system 1 (1E) of the fifth preferred embodiment, the operation part 6E of the image forming apparatus 10E further has a luminance adjusting dial 45.

The luminance adjusting dial 45 is rotated in an up-and-down direction with respect to an axis in the left-and-right direction. When the luminance adjusting dial 45 is moved upward, the luminance of the touch screen 25 increases, and when the luminance adjusting dial 45 is moved downward, the luminance of the touch screen 25 decreases.

In a state ST51 where the luminance adjusting dial 45 is positioned at a first position PG1 corresponding to a relatively high luminance through the operations of Steps S11 to S16 (see FIG. 8), an image GE1 (see FIG. 20) like the image GA1 of FIG. 6 is displayed as the operation image on the touch screen 75 of the remote operation apparatus 50 (50E). In this state ST51, the luminance (brightness) of the image GE1 in the touch screen 75 is also controlled to be a relatively high value VH.

After that, it is assumed that the operator rotates the luminance adjusting dial 45, and specifically the operator rotates the luminance adjusting dial 45 downward (performs an operation of decreasing the luminance). Then, in response to this luminance control operation (luminance decreasing operation), the luminance of the touch screen 25 is decreased to a luminance value VL (<VH) in accordance with the rotation angle after the rotation. The detection part 7 detects the rotation angle of the luminance adjusting dial 45 after the rotation, to thereby detect the state change relating to the luminance adjusting dial 45 (Step S23). Specifically, When the state of the luminance adjusting dial 45 is changed from a first state (a state where the rotation angle is an angle corresponding to the luminance value VH) to a second state (a state where the rotation angle is an angle corresponding to the luminance value VL), the detection part 7 detects the state change.

Further, screen control information NM2 (NM25) in accordance with this state change is transmitted from the image forming apparatus 10E to the remote operation apparatus 50E (Step S24). The screen control information NM25 is information indicating the state change by the luminance adjusting dial 45 from the high luminance state ST51 to a low luminance state ST52. Then, in response to the state change, the remote operation apparatus 50E which receives the screen control information NM25 changes the content displayed on the touch screen 75 from the simulated image GE1 to a new simulated image GE2 (see FIG. 21) in which the screen control information NM25 is reflected (Steps S25 and S26).

Herein, the simulated image GE1 (see FIG. 20) is an image generated by synthesizing a main body image P21 and a panel displaying image P22.

The panel displaying image P22 is the same image as the above-described panel displaying image P12 (see FIG. 6). The main body image P21 is almost the same image as the image P11 (see FIG. 6). The main body image P21, however, is different from the image P11 in that the image P21 also has a portion simulating the luminance adjusting dial 45. The main body image P21 has a horizontal line L1 representing the intensity of the luminance (luminance value) of the touch screen 25 in the simulated image of the luminance adjusting dial 45.

On the other hand, the simulated image GE2 (see FIG. 21) is an image generated by synthesizing a main body image P23 and a panel displaying image P24.

The panel displaying image P24 is an image simulating a portion corresponding to the touch screen 25, like the above-described panel displaying image P22 (see FIG. 20). The image P24, however, is different from the image P22 in that the luminance of the portion corresponding to the touch screen 25 is decreased as compared with the image P22.

Further, the main body image P23 is an image simulating a portion corresponding to the lower portion of the main body 21, like the above-described image P21 (see FIG. 20). The main body image P23 has a horizontal line L2 representing the intensity of the luminance (luminance value) of the touch screen 25 in the simulated image of the luminance adjusting dial 45.

Further, conversely, when a luminance increasing operation of almost the same degree is performed by using the luminance adjusting dial 45, screen control information NM3 (NM35) in accordance with a state change from the state ST52 to the state ST51 is transmitted to the remote operation apparatus 50E. When the remote operation apparatus 50E receives the screen control information NM35 from the image forming apparatus 10E, the remote operation apparatus 50E displays the simulated image GE1 on the touch screen 75 again.

Further, in the fifth preferred embodiment, the luminance of the touch screen 25 is changed in multiple levels in accordance with the rotation angle of the luminance adjusting dial 45, and the luminance of the portion of the touch screen 75 corresponding to the touch screen 25 is also changed in multiple levels in accordance with the luminance of the touch screen 25.

Thus, in response to the luminance control operation using the luminance adjusting dial 45, the state of the operation screen (the touch screen 75) of the remote operation apparatus 50E is changed to a state in which the luminance controlled by using the luminance adjusting dial 45 is reflected. By this operation, the operator UB of the remote operation apparatus 50E (the operator of the call center or the like) can make explanation on how to operate the image forming apparatus to the operator UA thereof while watching the simulated image GE2 having the same state as the actual state of the operation part GE which the operator UA of the image forming apparatus 10E uses. Particularly, the operator UB of the remote operation apparatus 50E can correctly recognize the luminance of the touch screen 25 of the image forming apparatus 10E. Therefore, the operator UB of the remote operation apparatus 50E can make appropriate explanation on the luminance control operation. For example, even if the operator UA unconsciously manipulates the luminance adjusting dial 45 to thereby cause the luminance of the touch screen 25 to be too low, the operator UB of the remote operation apparatus 50E can correctly recognize such a situation and give a suggestion for improvement to the operator UA of the image forming apparatus 10E.

Further, though the case has been discussed where the straight lines L1 and L2 representing the luminance values VH and VL are displayed in the images P21 and P23 (see FIGS. 20 and 21) in the above-discussed preferred embodiment, this is only one exemplary case and these straight lines L1 and L2 may not be displayed.

Furthermore, though the case has been discussed where the luminance of only part of the simulated image GA (partial image corresponding to the touch screen 25) in the touch screen 75 is changed in response to the change in the luminance of the touch screen 25 in the above-discussed preferred embodiment, this is only one exemplary case. For example, in response to the change in the luminance of the touch screen 25, the luminance of the entire simulated image GA in the touch screen 75 or the luminance of the touch screen 75 itself may be changed.

<6. Variations>

Though the preferred embodiments of the present invention have been discussed above, the present invention is not limited to the above-discussed preferred embodiments.

For example, though the case has been discussed where the screen control information NM is data or the like indicating the state after the change in the above-discussed preferred embodiments, this is only one exemplary case. The screen control information NM may be, for example, information including operation image data itself after the change. In more detail, the operation image (simulated image) GA itself in which the state change is reflected may be transmitted as the screen control information NM. In this case, it is not necessary to generate (synthesize) the simulated image GA on the side of the remote operation apparatus 50, and the simulated image GA which is transmitted may be displayed as the simulated image (operation image) after the change.

While the invention has been shown and described in detail, the foregoing description is in all aspects illustrative and not restrictive. It is therefore understood that numerous modifications and variations can be devised without departing from the scope of the invention.

What is claimed is:

1. An image forming system, comprising:
an image forming apparatus; and
a remote terminal remotely connected to said image forming apparatus,
wherein said image forming apparatus comprises:
a sensor for detecting a change of a shape of a hardware key itself in an operation part of said image forming apparatus, the operation part being configured to be actuatable by an input operation by an operator of the image forming apparatus, and the shape of the hardware key of the operation part being changed from a first shape to a second shape by the operator of the image forming apparatus; and
a first central processing unit (CPU) configured to transmit screen control information in accordance with the change of the shape of the hardware key itself detected by said sensor to said remote terminal, and
said remote terminal comprises:
a display for displaying a simulated image representing said operation part of said image forming apparatus, the simulated image including a representation of the hardware key of the operation part; and
a second central processing unit (CPU) configured to:
receive said screen control information; and
change the simulated image from a first image into a second image based on said screen control information,
the first image representing the operation part with the first shape of the hardware key, and the second image representing the operation part with the second shape of the hardware key.

2. The image forming system according to claim 1, wherein
said hardware key is provided on a rear surface side of a sliding operation panel in said operation part, and a first state of said hardware key where said hardware key is hidden behind said rear surface of said operation panel and a second state thereof where said hardware key is exposed, not being hidden behind said operation panel, are switched in response to a slide operation of said operation part, and
said sensor detects a state change between said first state of said hardware key and said second state thereof.

3. The image forming system according to claim 2, wherein
said second CPU is configured to receive said screen control information in accordance with said state change between said first state of said hardware key and said second state thereof, from said image forming apparatus, and
said second CPU is configured to switch a display image to be displayed on said display between said first image not having said hardware key and said second image having said hardware key, based on said screen control information.

4. The image forming system according to claim 3, wherein
said second CPU is configured to change said display image to be displayed on said display from said first image not having said hardware key into said second image having said hardware key in response to a state change from said first state of said hardware key into said second state thereof.

5. The image forming system according to claim 3, wherein
said second CPU is configured to change said display image to be displayed on said display from said second image having said hardware key into said first image not having said hardware key in response to a state change from said second state of said hardware key into said first state thereof.

6. The image forming system according to claim 2, wherein
said remote terminal further comprises:
a memory for storing in advance an element image group including a panel displaying image displaying said sliding operation panel and a key displaying image displaying said hardware key; and
the second CPU is configured to generate said simulated image to be displayed on said display by using said element image group,
said second CPU is configured to generate said first image not having the hardware key on the basis of said panel displaying image and generates said second image having said hardware key by synthesizing said panel displaying image and said key displaying image, and
said second CPU is configured to display said first image on said display in response to a state change from said second state of said hardware key into said first state thereof and displays said second image on said display in response to a state change from said first state of said hardware key into said second state thereof.

7. The image forming system according to claim 6, wherein
said second CPU is configured to generate said second image by synthesizing said panel displaying image and said key displaying image in a state where said panel displaying image is slidingly moved in a predetermined direction with respect to an arrangement position of said panel displaying image in said first image.

8. The image forming system according to claim 1, wherein
said hardware key is a sheet member configured to be flipped in said operation part, and
said sensor detects a state change between a first state before a flip operation of said sheet member and a second state after said flip operation.

9. The image forming system according to claim 8, wherein
 a first function group is assigned to a plurality of buttons in said operation part in said first state,
 a second function group is assigned to said plurality of buttons in said second state,
 said second CPU is configured to display said first image including a correspondence displaying image indicating a correspondence between said plurality of buttons and said first function group on said display when said sheet member is in said first state, and
 said second CPU is configured to synthesize said second image including a correspondence displaying image indicating a correspondence between said plurality of buttons and said second function group and displays said second image on said display in response to a state change from said first state of said sheet member into said second state caused by said flip operation of said sheet member.

10. The image forming system according to claim 1, wherein
 said hardware key is a power button in said operation part, and
 said sensor detects a state change between a first state before a power-off operation using said power button and a second state after said power-off operation.

11. The image forming system according to claim 10, wherein
 said second CPU is configured to synthesize a partial image indicating that a touch screen in the operation part is inoperative into said second image and displays said second image in response to a state change from said first state of said power button into said second state thereof.

12. The image forming system according to claim 1, wherein
 said hardware key is part of an external keyboard connectable to said image forming apparatus, and
 said sensor detects a state change between a first state where said external keyboard is not connected to said image forming apparatus and a second state where said external keyboard is connected to said image forming apparatus.

13. The image forming system according to claim 12, wherein
 said second CPU is configured to synthesize an image of said external keyboard into said second image and displays said second image in response to a state change from said first state relating to said external keyboard into said second state.

14. The image forming system according to claim 1, wherein
 said hardware key is a luminance adjusting dial in said operation part, and
 said sensor detects a rotation angle of said luminance adjusting dial.

15. The image forming system according to claim 14, wherein
 said second CPU is configured to change a luminance of the whole of or part of said second image by synthesis, in response to a state change of said luminance adjusting dial, in accordance with said rotation angle of said luminance adjusting dial after said state change.

16. The image forming system according to claim 1, wherein
 said second CPU is configured to display the second image in which said state change of the hardware key is reflected.

17. The image forming system according to claim 1, wherein the change of the shape corresponds to a positional or structural change of the hardware key of the operation part of the image forming apparatus due to a user operation.

18. The image forming system according to claim 1, wherein the second image is synthesized by the screen control information on the remote terminal.

19. The image forming system according to claim 1, wherein the second image is included in the screen control information.

20. The image forming system according to claim 1, wherein the remote terminal is a remote operation apparatus configured to remotely operate the image forming apparatus.

21. The image forming system according to claim 1, wherein the shape of the hardware key of the image forming apparatus is changed by the operator when the operator operates the hardware key for data input operation to the image forming apparatus.

22. An image forming apparatus which can be remotely connected to a remote terminal, comprising:
 an operation part having a hardware key, the operation part being configured to be actuatable by an input operation by an operator of the image forming apparatus;
 a hardware processor configured to;
 detect a change of a shape of said hardware key itself in the operation part of said image forming apparatus, the shape of the hardware key of the operation part being changed from a first shape to a second shape by the operator of the image forming apparatus; and
 transmit screen control information in accordance with the change of the shape of the hardware key itself detected by said detection step to said remote terminal, to thereby change a display image displayed on a display screen of said remote terminal from a first image into a second image based on said screen control information,
 the first image representing the operation part with the first shape of the hardware key itself, and the second image representing the operation part with the second shape of the hardware key.

23. The image forming apparatus according to claim 22, wherein the change of the shape corresponds to a positional or structural change of the hardware key of the operation part of the image forming apparatus due to a user operation.

24. The image forming apparatus according to claim 22, wherein
 said hardware key is provided on a rear surface side of a sliding operation panel in said operation part, and a first state of said hardware key where said hardware key is hidden behind said rear surface of said operation panel and a second state thereof where said hardware key is exposed, not being hidden behind said operation panel, are switched in response to a slide operation of said operation part, and
 said hardware processor detects a state change between said first state of said hardware key and said second state thereof.

25. The image forming apparatus according to claim 22, wherein
 said hardware key is a sheet member configured to be flipped in said operation part, and said hardware processor detects a state change between a first state before a flip operation of said sheet member and a second state after said flip operation.

26. The image forming apparatus according to claim 22, wherein
said hardware key is a power button in said operation part, and
said hardware processor detects a state change between a first state before a power-off operation using said power button and a second state after said power-off operation.

27. The image forming apparatus according to claim 22, wherein
said hardware key is part of an external keyboard connectable to said image forming apparatus, and
said hardware processor detects a state change between a first state where said external keyboard is not connected to said image forming apparatus and a second state where said external keyboard is connected to said image forming apparatus.

28. The image forming apparatus according to claim 22, wherein
said hardware key is a luminance adjusting dial in said operation part, and
said hardware processor detects a rotation angle of said luminance adjusting dial.

29. The image forming apparatus according to claim 22, wherein the second image is synthesized by the screen control information on the remote terminal.

30. The image forming apparatus according to claim 22, wherein the second image is included in the screen control information.

31. The image forming apparatus according to claim 22, wherein the remote terminal is a remote operation apparatus configured to remotely operate the image forming apparatus.

32. The image forming apparatus according to claim 22, wherein the shape of the hardware key of the image forming apparatus is changed by the operator when the operator operates the hardware key for data input operation to the image forming apparatus.

33. A remote terminal capable of being remotely connected to an image forming apparatus, comprising:
a display for displaying a simulated image representing an operation part of said image forming apparatus, the simulated image including a representation of the hardware key of the operation part, the operation part being configured to be actuatable by an input operation by an operator of the image forming apparatus;
a hardware processor configured to;
receive screen control information from said image forming apparatus, said screen control information being generated based on a detection of a change of a shape of a hardware key in said operation part of said image forming apparatus, the shape of the hardware key of the operation part being changed from a first shape to a second shape by the operator of the image forming apparatus; and
change the simulated image from a first image into a second image based on said screen control information, the first image representing the operation part with the first shape of the hardware key itself and the second image representing the operation part with the second shape of the hardware key.

34. The remote terminal according to claim 33, wherein the change of the shape corresponds to a positional or structural change of the hardware key of the operation part of the image forming apparatus due to a user operation.

35. The remote terminal according to claim 33, wherein
said hardware key is provided on a rear surface side of a sliding operation panel in said operation part, and a first state of said hardware key where said hardware key is hidden behind said rear surface of said operation panel and a second state thereof where said hardware key is exposed, not being hidden behind said operation panel, are switched in response to a slide operation of said operation part, and
a sensor of the image forming apparatus detects a state change between said first state of said hardware key and said second state thereof.

36. The remote terminal according to claim 35, wherein
said hardware processor receives said screen control information in accordance with said state change between said first state of said hardware key and said second state thereof, from said image forming apparatus, and
said hardware processor switches a display image to be displayed on said display between said first image not having said hardware key and said second image having said hardware key, based on said screen control information.

37. The remote terminal according to claim 35, wherein:
the remote terminal further comprises a memory for storing in advance an element image group including a panel displaying image displaying said sliding operation panel and a key displaying image displaying said hardware key,
the hardware processor is configured to generate said simulated image to be displayed on said display by using said element image group,
the hardware processor generates said first image not having the hardware key on the basis of said panel displaying image and generates said second image having said hardware key by synthesizing said panel displaying image and said key displaying image, and
the hardware processor displays said first image on said display in response to a state change from said second state of said hardware key into said first state thereof and displays said second image on said display in response to a state change from said first state of said hardware key into said second state thereof.

38. The remote terminal according to claim 36, wherein
said hardware processor changes said display image to be displayed on said display from said first image not having said hardware key into said second image having said hardware key in response to a state change from said first state of said hardware key into said second state thereof.

39. The remote terminal according to claim 36, wherein
said hardware processor changes said display image to be displayed on said display from said second image having said hardware key into said first image not having said hardware key in response to a state change from said second state of said hardware key into said first state thereof.

40. The remote terminal according to claim 37, wherein said hardware processor generates said second image by synthesizing said panel displaying image and said key displaying image in a state where said panel displaying image is slidingly moved in a predetermined direction with respect to an arrangement position of said panel displaying image in said first image.

41. The remote terminal according to claim 33, wherein
said hardware key is a sheet member configured to be flipped in said operation part, and a sensor of the image forming apparatus detects a state change between a first state before a flip operation of said sheet member and a second state after said flip operation.

42. The remote terminal according to claim 41, wherein
a first function group is assigned to a plurality of buttons in said operation part in said first state,
a second function group is assigned to said plurality of buttons in said second state,
said hardware processor displays said first image including a correspondence displaying image indicating a correspondence between said plurality of buttons and said first function group on said display when said sheet member is in said first state, and
said hardware processor synthesizes said second image including a correspondence displaying image indicating a correspondence between said plurality of buttons and said second function group and displays said second image on said display in response to a state change from said first state of said sheet member into said second state caused by said flip operation of said sheet member.

43. The remote terminal according to claim 33, wherein
said hardware key is a power button in said operation part, and
a sensor of the image forming apparatus detects a state change between a first state before a power-off operation using said power button and a second state after said power-off operation.

44. The remote terminal according to claim 43, wherein
said hardware processor synthesizes a partial image indicating that a touch screen in the operation part is inoperative into said second image and displays said second image in response to a state change from said first state of said power button into said second state thereof.

45. The remote terminal according to claim 33, wherein
said hardware key is part of an external keyboard connectable to said image forming apparatus, and
a sensor of the image forming apparatus detects a state change between a first state where said external keyboard is not connected to said image forming apparatus and a second state where said external keyboard is connected to said image forming apparatus.

46. The remote terminal according to claim 45 wherein
said hardware processor synthesizes an image of said external keyboard into said second image and displays said second image in response to a state change from said first state relating to said external keyboard into said second state.

47. The remote terminal according to claim 33, wherein
said hardware key is a luminance adjusting dial in said operation part, and
a sensor of the image forming apparatus detects a rotation angle of said luminance adjusting dial.

48. The remote terminal according to claim 47, wherein
said hardware processor changes a luminance of the whole of or part of said second image by synthesis, in response to a state change of said luminance adjusting dial, in accordance with said rotation angle of said luminance adjusting dial after said state change.

49. The remote terminal according to claim 33, wherein the second image is synthesized by the screen control information on the remote terminal.

50. The remote terminal according to claim 33, wherein the second image is included in the screen control information.

51. The remote terminal according to claim 33, wherein the remote terminal is a remote operation apparatus configured to remotely operate the image forming apparatus.

52. The remote terminal according to claim 33, wherein the shape of the hardware key of the image forming apparatus is changed by the operator when the operator operates the hardware key for data input operation to the image forming apparatus.

53. A non-transitory computer-readable recording medium for recording therein a computer program configured to be executed by a computer to cause said computer to perform the steps of:
a) displaying a simulated image representing an operation part of an image forming apparatus on a display, the simulated image comprising a representation of the hardware key of the operation part, the operation part being configured to be actuatable by an input operation by an operator of the image forming apparatus;
b) receiving screen control information from said image forming apparatus, said screen control information being generated based on a detection of a change of a shape of a hardware key in said operation part of said image forming apparatus, the shape of the hardware key of the operation part being changed from a first shape to a second shape by the operator of the image forming apparatus; and
c) changing the simulated image from a first image into a second image based on said screen control information,
the first image representing the operation part with the first shape of the hardware key itself and the second image representing the operation part with the second shape of the hardware key.

54. The non-transitory computer-readable recording medium according to claim 53, wherein the change of the shape corresponds to a positional or structural change of the hardware key of the operation part of the image forming apparatus due to a user operation.

55. The non-transitory computer-readable recording medium according to claim 53, wherein
said hardware key is provided on a rear surface side of a sliding operation panel in said operation part, and a first state of said hardware key where said hardware key is hidden behind said rear surface of said operation panel and a second state thereof where said hardware key is exposed, not being hidden behind said operation panel, are switched in response to a slide operation of said operation part, and
a sensor of the image forming apparatus detects a state change between said first state of said hardware key and said second state thereof.

56. The non-transitory computer-readable recording medium according to claim 55, wherein
said screen control information is received in accordance with said state change between said first state of said hardware key and said second state thereof, from said image forming apparatus, and
a display image to be displayed is switched between said first image not having said hardware key and said second image having said hardware key, based on said screen control information.

57. The non-transitory computer-readable recording medium according to claim 55, wherein:
an element image group, including a panel displaying image displaying said sliding operation panel and a key displaying image displaying said hardware key, is stored in advance, the simulated image to he displayed is generated by using said element image group, the first image not having the hardware key is generated on the basis of said panel displaying image and generates said second image having said hardware key by synthesizing said panel displaying image and aid key displaying image, and said first image is displayed in response to a state change from said second state of said hardware key into said first state thereof and displays said second image, in response to a state change from said first state of said hardware key into said second state thereof.

58. The non-transitory computer-readable recording, medium according to claim 56 wherein said display image to be displayed is hanged from said first image not having said hardware key into said second image having said hardware key in response to a state change from said first state of said hardware key into said second state thereof.

59. The non-transitory computer-readable recording medium according to claim 56, wherein said display image to be displayed is changed from said second image having said hardware are key into said first age not having said hardware key in response to a state change from said second state of said hardware key into said first state thereof.

60. The non-transitory computer-readable recording medium according to claim 57 wherein said second image is generated by synthesizing said panel displaying image and said key displaying image in a state where said panel displaying image is slidingly moved in a predetermined direction with respect to an arrangement position of said panel displaying image In said first image.

61. The non-transitory computer-readable recording medium according to claim 53, wherein said hardware key is a sheet member configured to be flipped in said operation part, and a sensor of the image forming apparatus detects a state change between a first state before a flip operation of said sheet member and a second state after said flip operation.

62. The non-transitory computer-readable recording medium according to claim 61, wherein a first function group is assigned to a plurality of buttons in said operation part in said first state, a second function group is assigned to said plurality of buttons in said second state;

said first image is displayed including a correspondence displaying image indicating a correspondence between said plurality of buttons and said first function group when said sheet member is in said first state, and said second image is synthesized including a correspondence displaying image indicating a correspondence between said plurality of buttons and said second function group, and is displayed in response to a state change from said first state of said sheet member into said second state caused by said flip operation of said sheet member.

63. The non-transitory computer-readable recording medium according to claim 53, wherein said hardware key is a power button in said operation part, and a sensor of the image forming apparatus detects a state change between a first state before a power-off operation using said power button and a second state after said power-off operation.

64. The non-transitory computer-readable recording medium according to claim 63, wherein a partial image indicating that a touch screen in the operation part is inoperative is synthesized into said second image, and said second image is displayed in response to a state change from said first state of said power button into said second state thereof.

65. The non-transitory computer-readable recording medium according to claim 53, wherein said hardware key is part of an external keyboard connectable to said image forming apparatus, and a sensor of the image forming apparatus detects a state change between a first state where said external keyboard is not connected to said image forming apparatus and a second state where said external keyboard is connected to said image forming apparatus.

66. The non-transitory computer-readable recording medium according to claim 65, wherein an image of said external keyboard is synthesized into said second image, said second image is displayed in response to a state change from said first state relating to said external keyboard into said second state.

67. The non-transitory computer-readable recording medium according to claim 65, wherein a luminance of the whole of or part of said second image is changed by synthesis, in response to a state change of said luminance adjusting dial, in accordance with said rotation angle of said luminance adjusting dial after said state change.

68. The non-transitory computer-readable recording medium according to claim 53, wherein said hardware key is a luminance adjusting dial in said operation part, and a sensor of the image forming apparatus detects a rotation angle of said luminance adjusting dial.

69. The non-transitory computer-readable recording medium according to claim 53, wherein the second image is synthesized by the screen control information.

70. The non-transitory computer-readable recording medium according to claim 53, wherein the second image is included in the screen control information.

71. The non-transitory computer-readable recording medium according to claim 53, wherein the non-transitory computer-readable recording medium is part of a remote terminal which is a remote operation apparatus configured to remotely operate the image forming apparatus, and the remote operation apparatus is configured to perform the steps of displaying, receiving and changing.

72. The non-transitory computer-readable recording medium according to claim 53, wherein the shape of the hardware key of the image forming apparatus is changed by the operator when the operator operates the hardware key for data input operation to the image forming apparatus.

* * * * *